United States Patent
Kasper

(10) Patent No.: US 6,401,294 B2
(45) Date of Patent: Jun. 11, 2002

(54) UPRIGHT EXTRACTON CLEANING MACHINE WITH HANDLE MOUNTING

(75) Inventor: Gary A. Kasper, Grand Rapids, MI (US)

(73) Assignee: Bissell Homecare, Inc., Grand Rapids, MI (US)

(*) Notice: Subject to any disclaimer, the term of this patent is extended or adjusted under 35 U.S.C. 154(b) by 0 days.

(21) Appl. No.: 09/864,847

(22) Filed: May 24, 2001

Related U.S. Application Data

(62) Division of application No. 09/575,929, filed on May 23, 2000, now Pat. No. 6,286,181, which is a division of application No. 09/112,527, filed on Jul. 8, 1998, now Pat. No. 6,167,587.
(60) Provisional application No. 60/075,924, filed on Feb. 25, 1998, and provisional application No. 60/052,021, filed on Jul. 9, 1997.

(51) Int. Cl.[7] .................................................. A47L 9/32
(52) U.S. Cl. ......................................... 15/320; 15/410
(58) Field of Search ..................................... 15/320, 410

(56) References Cited

U.S. PATENT DOCUMENTS

| | | | |
|---|---|---|---|
| 2,633,597 A | * | 4/1953 | Turner ....................... 15/410 X |
| 2,850,757 A | | 9/1958 | Duff |
| 2,980,939 A | | 4/1961 | Sparklin et al. |
| 3,031,710 A | | 5/1962 | Huening, Jr. |
| 3,634,905 A | | 1/1972 | Boyd |
| 4,129,920 A | * | 12/1978 | Evans et al. ............... 15/410 X |
| 4,353,145 A | | 10/1982 | Woodford |
| 4,660,246 A | | 4/1987 | Duncan et al. |
| 4,670,937 A | | 6/1987 | Sumerau et al. |
| 4,724,574 A | | 2/1988 | Bowerman et al. |
| 5,500,977 A | | 3/1996 | McAllise et al. |
| 5,524,321 A | | 6/1996 | Weaver et al. |
| 5,933,912 A | * | 8/1999 | Karr et al. ..................... 15/320 |
| 6,154,917 A | * | 12/2000 | Zahuranec et al. ........... 15/320 |
| 6,243,916 B1 | * | 6/2001 | Embree et al. ........... 15/410 X |

* cited by examiner

Primary Examiner—Chris K. Moore
(74) Attorney, Agent, or Firm—McGarryBair LLP

(57) ABSTRACT

A portable surface cleaning apparatus including a base module for movement along a surface, an upright handle pivotally attached to the base module, a liquid dispensing system including a fluid supply chamber in the form of a bladder for holding a supply of cleaning fluid, a fluid recovery system including a tank on the base module having a fluid recovery chamber for holding recovered fluid and housing the flexible bladder, wherein the recovery chamber is in fluid communication with the fluid supply chamber and the pressure in the flexible bladder is equalized with the pressure in the tank as the cleaning fluid is dispensed from the supply chamber and the dirty liquid is collected in the recovery chamber. The base module includes upper and lower housing portions and the upright handle is pivotably mounted to the base module through at least one bearing for rotatable reception in the housing.

15 Claims, 17 Drawing Sheets

UPRIGHT EXTRACTON CLEANING MACHINE WITH HANDLE MOUNTING

CROSS REFERENCE TO RELATED APPLICATIONS

This application is a divisional application of U.S. patent application Ser. No. 09/575,929, filed May 23, 2000, now U.S. Pat. No. 6,286,181, issued Sep. 11, 2001, which is a divisional application of U.S. patent application Ser. No. 09/112,527, filed Jul. 8, 1998, now U.S. Patent No. 6,167,587, issued Jan. 2, 2001, which claims the benefit of U.S. Provisional Application Ser. No. 60/075,924, filed on Feb. 25, 1998, and U.S. Provisional Application Serial No. 60/052,021, filed on Jul. 9, 1997.

BACKGROUND OF THE INVENTION

1. Field of the Invention

This invention relates to an extraction cleaning machine. In one of its aspects, the invention relates to an upright extraction cleaning machine with a bearing for pivotally mounting a handle to a base.

2. Description of the Related Art

Upright extraction cleaning machines have been used for removing dirt from surfaces such as carpeting, upholstery, drapes and the like. The known extraction cleaning machines can be in the form of a canister-type unit as disclosed in U.S. Pat. No. 5,237,720 to Blase et al. or an upright unit as disclosed in U.S. Pat. No. 5,500,977 to McAllise et al. and U.S. Pat. No. 4,559,665 to Fitzwater.

Current upright extraction cleaning machines can be made easier to use by limiting the weight and number of components, such as fluid storage tanks, on the pivoting handle of the upright cleaning machine. Reducing the weight that a user must support as the handle is tilted rearwardly can also lower the center of gravity for the machine, which results in a better feel to the user.

SUMMARY OF THE INVENTION

According to the invention, a portable surface cleaning apparatus comprises a base module for movement along a surface and having a rear portion, an upright handle pivotally attached to the rear portion of the base module, a liquid dispensing system and a fluid recovery system. The base module includes an upper housing portion and a lower housing portion. An upright handle is pivotally mounted to the rear portion of the base module through at least one bearing for pivotal reception in the housing. According to the invention, a socket is formed between the upper and lower housing portions for rotatably receiving the bearing. Preferably, the bearing is formed integral with the lower portion of the upright handle. Desirably, the socket is formed by arcuate surfaces in mated edges of the upper and lower housing portions. The lower portion of the upright handle includes diverging arms, each including a bearing. Each bearing is formed integral with the lower portion of the upright handle. Typically, wheels are mounted to an axle which are received within the bearings for rotationally mounting the wheels to the handle.

Further according to the invention, a portable surface cleaning apparatus has a base module comprising a base housing having an upper housing portion and a lower housing portion which have arcuate surfaces that between them define a socket. An upright has depending arms spanning the base housing and having inner and outer sides, with the inner sides being adjacent the base housing. The inner sides of the arms have bearings which are rotatably received in the socket defined by the arcuate surfaces of the upper and lower housing portions for pivotally mounting the handle to the base housing.

Preferably, the bearings are formed integrally with the arms. In one embodiment, the arcuate surfaces are formed by sidewalls of the upper and lower housing portions. Each bearing has an axis about which the handle pivots with respect to the base housing, an axle is mounted to each of the bearings and is coaxial with respect to the axis of the bearings and a wheel is rotatably mounted to each of the axles.

In a preferred embodiment, each bearing has a circumferential slot in which the arcuate surfaces are received. Further, the bearings have a relatively large diameter relative to the axles.

DESCRIPTION OF THE PREFERRED EMBODIMENT

Figure 1:
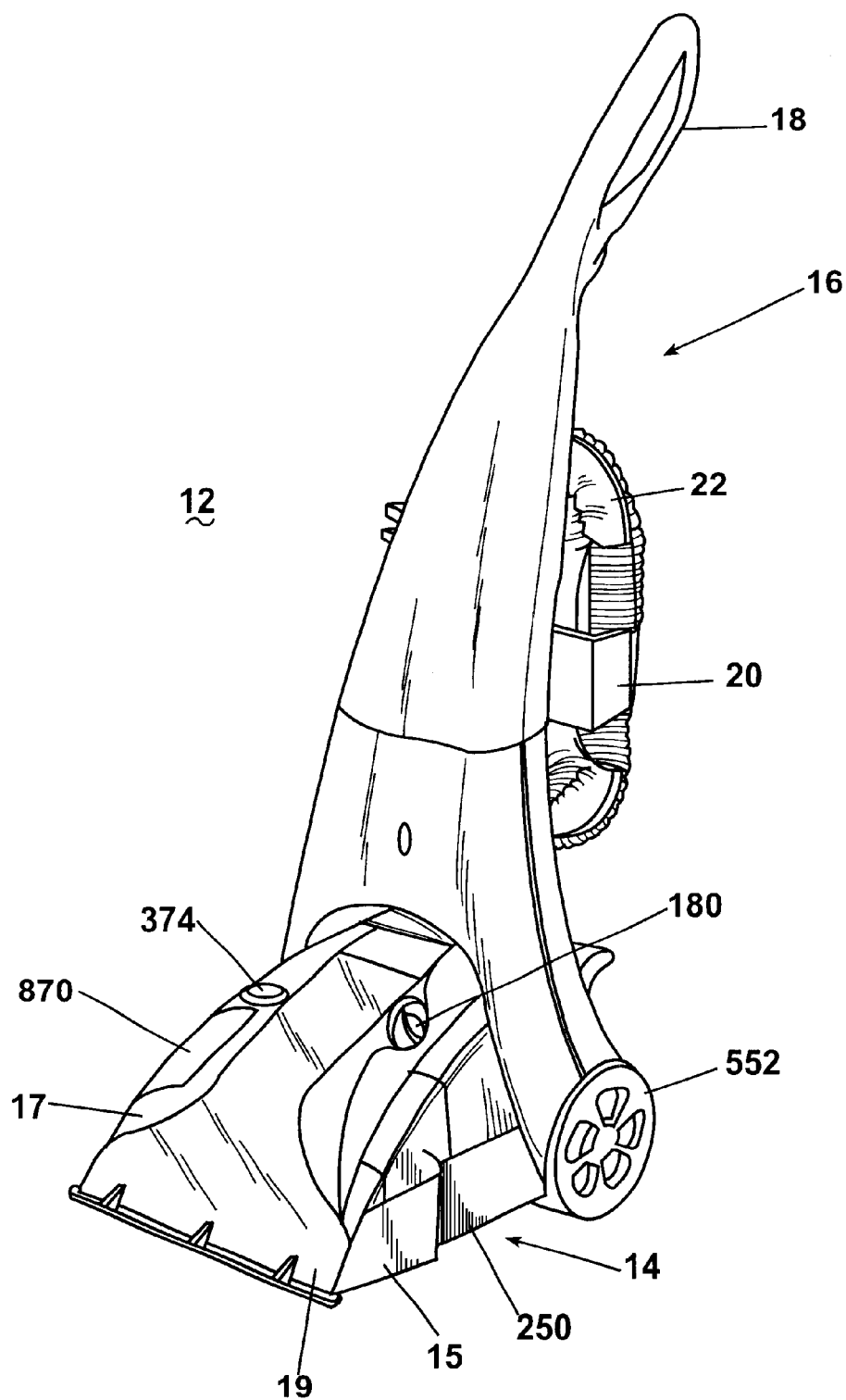
FIG. 1 is a perspective view of the extraction cleaning machine according to the invention.

Referring now to the drawings and to FIG. 1 in particular, an upright extraction cleaning machine 12 according to the invention is shown. The machine 12 is a portable surface cleaning apparatus including a base module 14 adapted to roll across a surface to be cleaned and an upright handle assembly 16 pivotably mounted to a rear portion of the base module 14.

Figure 2:
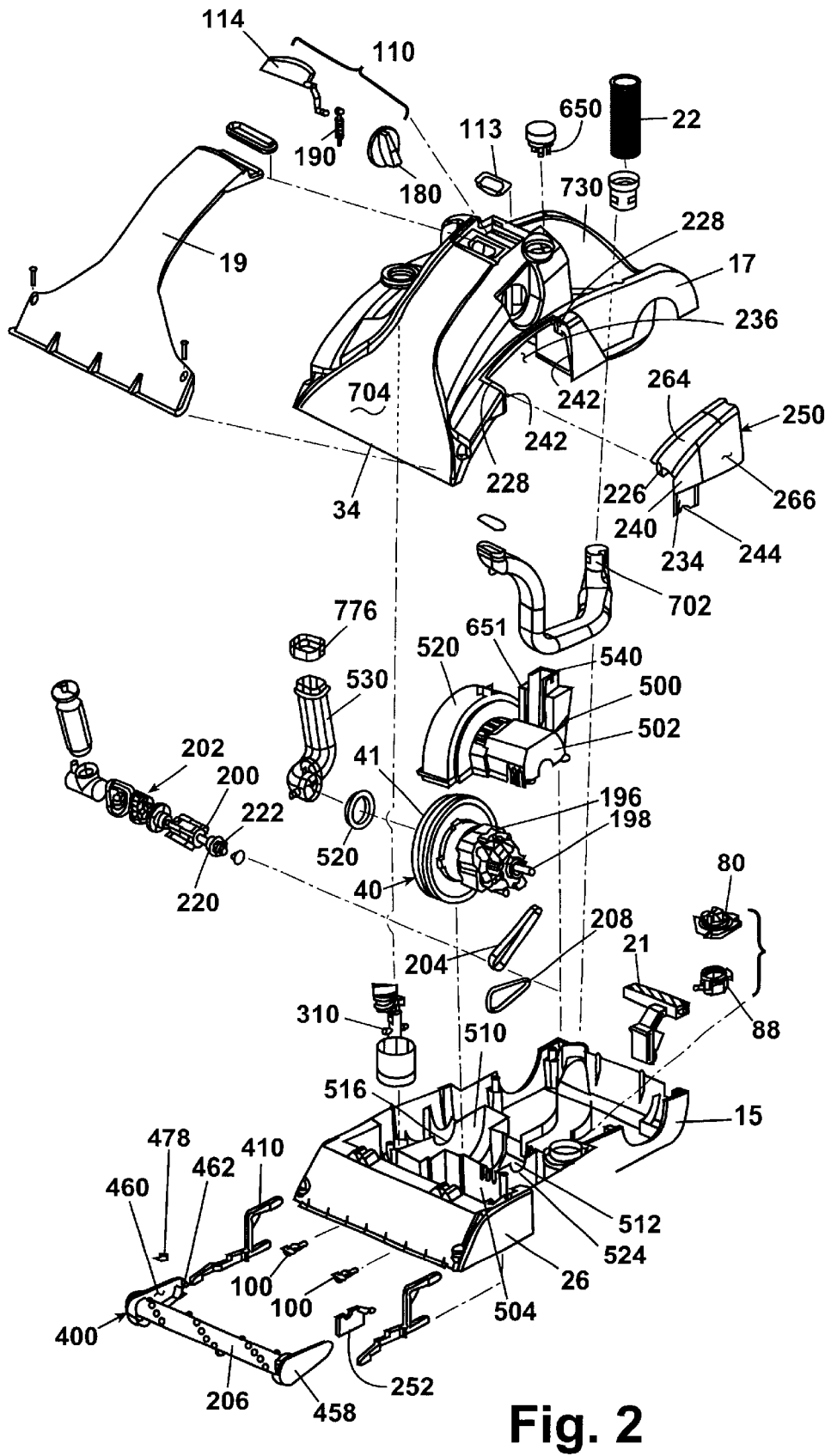
FIG. 2 is an exploded view of a base module of the extraction cleaning machine shown in FIG. 1.
Figure 3:
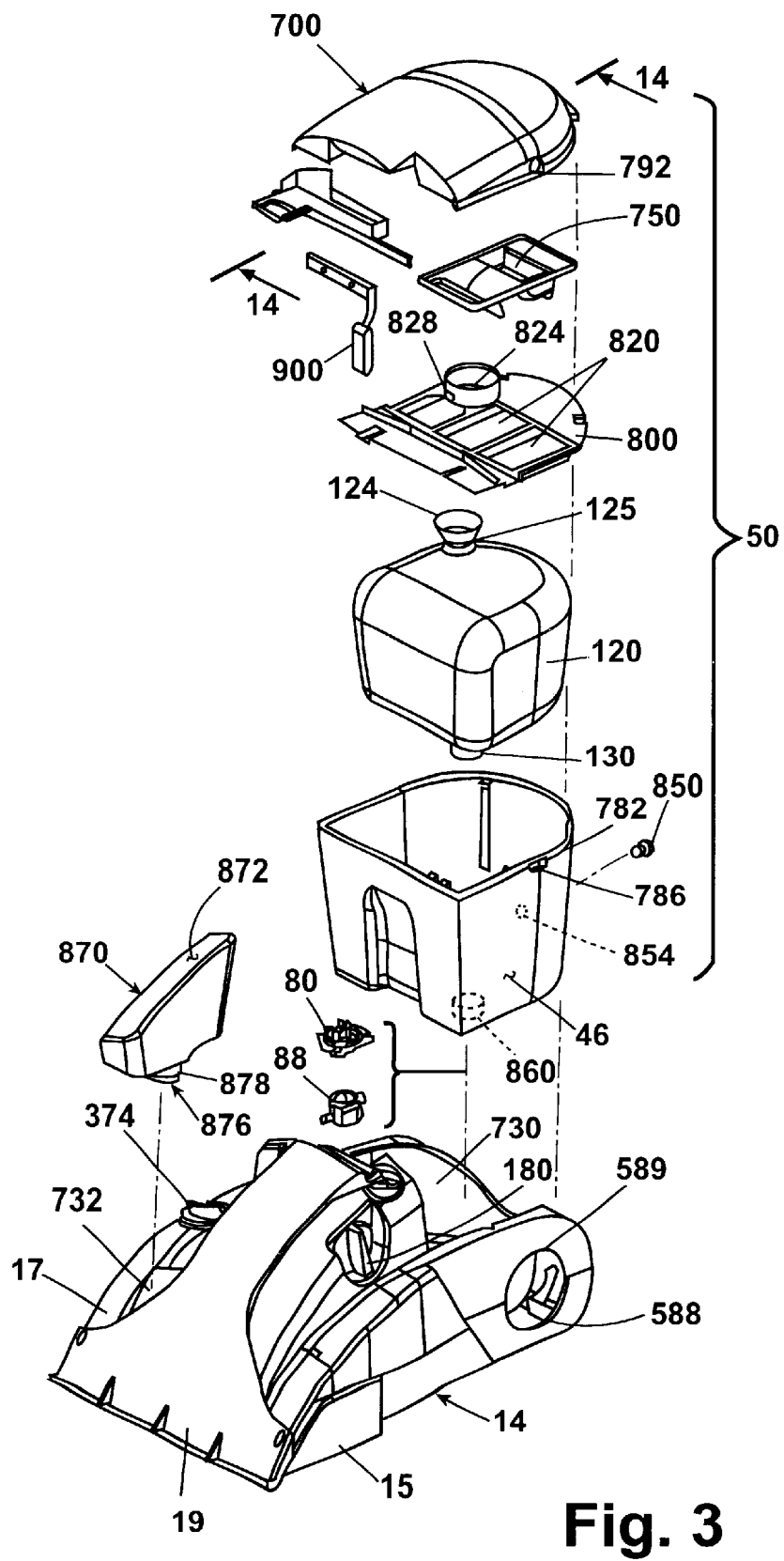
FIG. 3 is an exploded view of a base module and tank assembly of the extraction cleaning machine of FIG. 1.

As best shown in FIGS. 1–3, the base module 14 includes a lower housing portion 15 and an upper housing portion 17, which together define an interior for housing components and a well 730 for receiving a tank assembly 50. Further, a well 732 in the upper housing portion 17 receives a detergent supply tank 870, as best shown in FIG. 3. The upper housing portion 17 receives a transparent facing 19 for defining a first working air conduit 704 and a suction nozzle 34, which is disposed at a front portion of the base module 14 adjacent the surface being cleaned for recovering fluid therefrom. The handle assembly 16 has a closed loop grip 18 provided at the uppermost portion thereof and a combination hose and cord wrap 20 that is adapted to support an accessory hose 22 and a electrical cord (not shown) when either is not in use. A latch assembly 21 is pivotably mounted to the rear portion of the base module 14 adjacent the rotational union of the handle assembly 16 therewith for releasably locking the handle assembly 16 in its upright position.

As shown in FIG. 2, the base module 14 houses a drive motor 196 that is connected to a source of electricity by the electrical cord. A motor compartment 500 within the base module 14 is a clamshell-shaped housing for holding a motor assembly in place and preventing rotation thereof. The clamshell motor compartment 500 includes an upper half 502 and a lower half 504. The upper half 502 is removable from the lower half 504, which is integral to the extraction cleaner base module 14. Thus, a bottom wall of the lower half 504 is the bottom surface of the extraction cleaner base module 14. An arm 651 extends upwardly from the motor housing 500 in the base module 14 to support the flow indicator 650, which is mounted to an upper end thereof. An opening 653 in the upper housing portion 17 receives the flow indicator 650 when that portion is mounted to the lower housing portion 15.

The motor compartment 500 includes a large circular impeller fan housing 510 and a smaller motor housing 512, further having a generally T-shaped cross section. The impeller fan housing 510 surrounds an inner housing 41 defining a vacuum source 40, which is created preferably by an impeller (not shown) disposed within the housing 41. The housing 41 includes a large aperture 516 for mounting a vacuum intake duct 530, which is sealed to the aperture 516 by a gasket 520. The vacuum intake duct 530 connects the vacuum source 40 to an air/water separation chamber 750 (shown in FIGS. 3, 14, 14A, 14B and 15) in a lid 700 on the tank assembly 50, as well as the suction nozzle 34 on the front portion of the base module 14 and a suction nozzle (not shown) on a distal end of the accessory hose 22. The smaller end 512 includes a small aperture 524 for receiving therethrough a motor drive shaft 198. A stretch belt 204 is received on the motor drive shaft 198 outside of the clamshell motor compartment 500. Further, an upper surface 520 of the motor compartment 500 supports and secures an accessory hose intake duct 540 partially defining a second working air conduit 706 (as shown best in FIGS. 12–14), which connects the suction nozzle on the distal end of the accessory hose 22 to the vacuum source 40.

Figure 5:
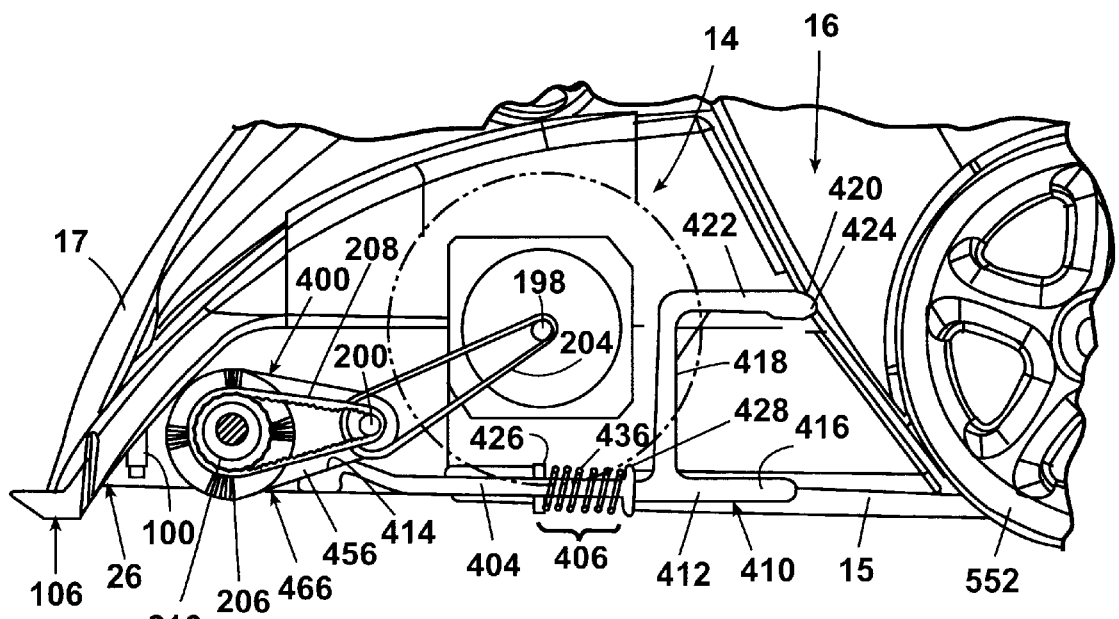
FIG. 5 is a partial sectional side view of the foot module of the extraction cleaning machine of FIG. 1.
Figure 6:
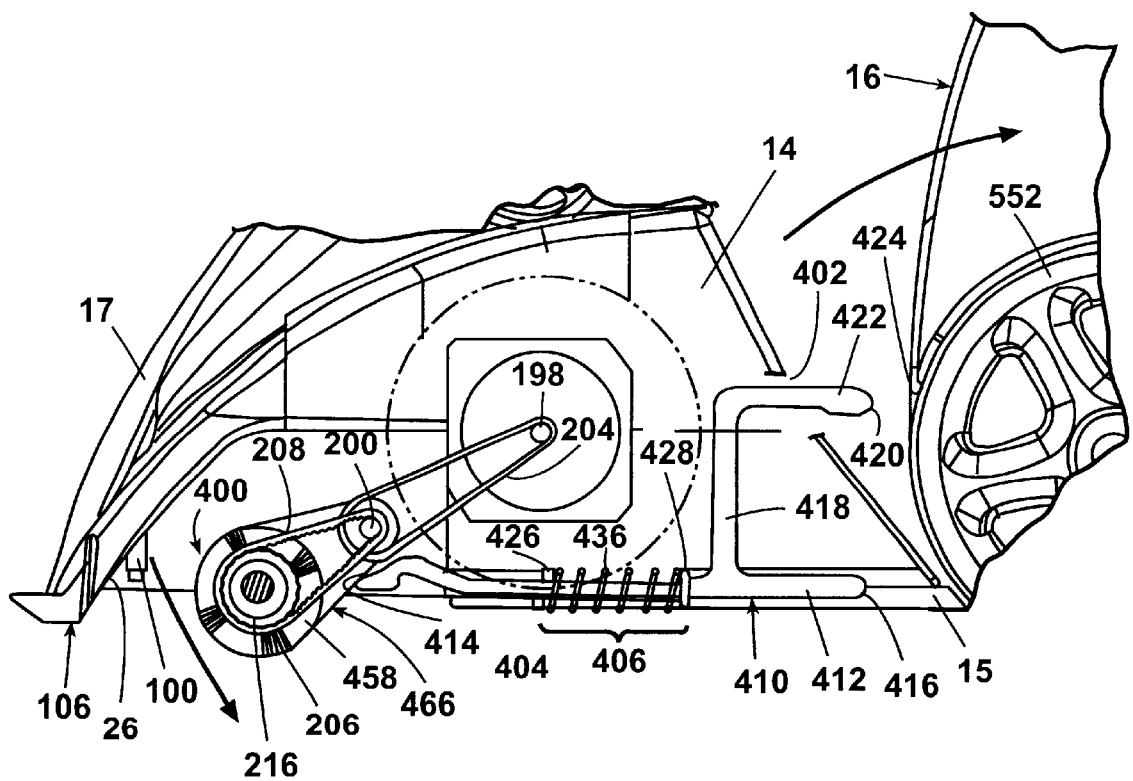
FIG. 6 is a partial sectional side view of the extraction cleaning machine of FIG. 1 with the handle assembly in a tilted position.

The drive shaft 198 of the drive motor 196 is connected to an interim drive shaft 200 of a solution pump 202 by the stretch belt 204, which in turn, is connected to a rotatably mounted agitation brush 206 by a timing belt 208, as best illustrated in FIGS. 5 and 6. On the opposite side of the motor 196, the motor drive shaft 198 supports the impeller (not shown) within the impeller housing 41, which provides the vacuum source 40 and is mounted inside the housing 510 of the motor compartment 500. With this configuration, a single drive motor 196 is adapted to provide driving force for the impeller, the solution pump 202, and the agitation brush 206.

As best seen in FIGS. 2, 5, 5A, and 6, the rotatably mounted agitation brush 206 is adapted for floor-responsive adjustment by a floating brush assembly 400 mounted within an agitation brush housing 26 disposed within a forward portion of the base module 14. The floating movement of the agitation brush 206 is a horizontally oriented arcuate path for reciprocation toward and outward of the agitation brush housing 26. Ends 452 of an agitation brush shaft 206 are received in bearings 454, which in turn, are press fit into inwardly extending bosses 456 to provide a pair of opposed articulating arm members 458. Alternatively, stub shafts (not shown) can extend from the arm members 458 and the ends 452 can be replaced with bearings similar to 454 for rotational installation of the brush 206 on the arm members 458.

Each arm member 458 comprises a back plate 460 with a pivot pin 462 provided at the rear of the plate 460. In addition, a laterally extending belt guard 466 is preferably integrally formed with the articulating arm 458. The belt guard 466, which extends laterally inwardly enough to cover the timing belt 208, minimizes the lodging of threads and other foreign material in the timing belt 208 and protects the carpet or other surface positioned below the base assembly 14 from the rotating belt 208.

Figure 7:
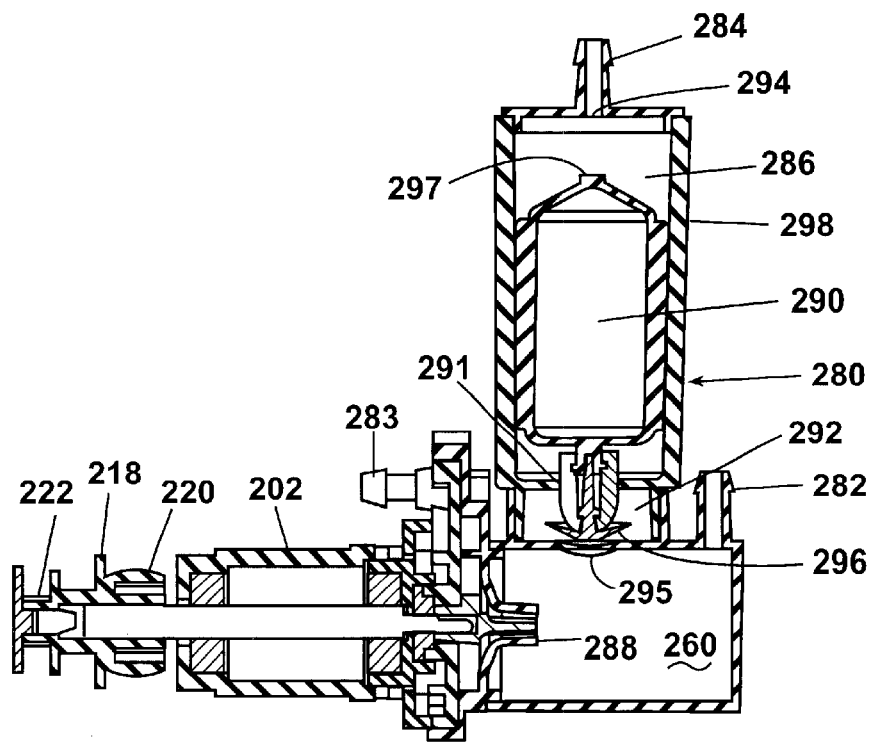
FIG. 7 is a side sectional view of the pump and pump priming assembly of the extraction cleaning machine of FIG. 1 with a plunger in a first position.
Figure 9:
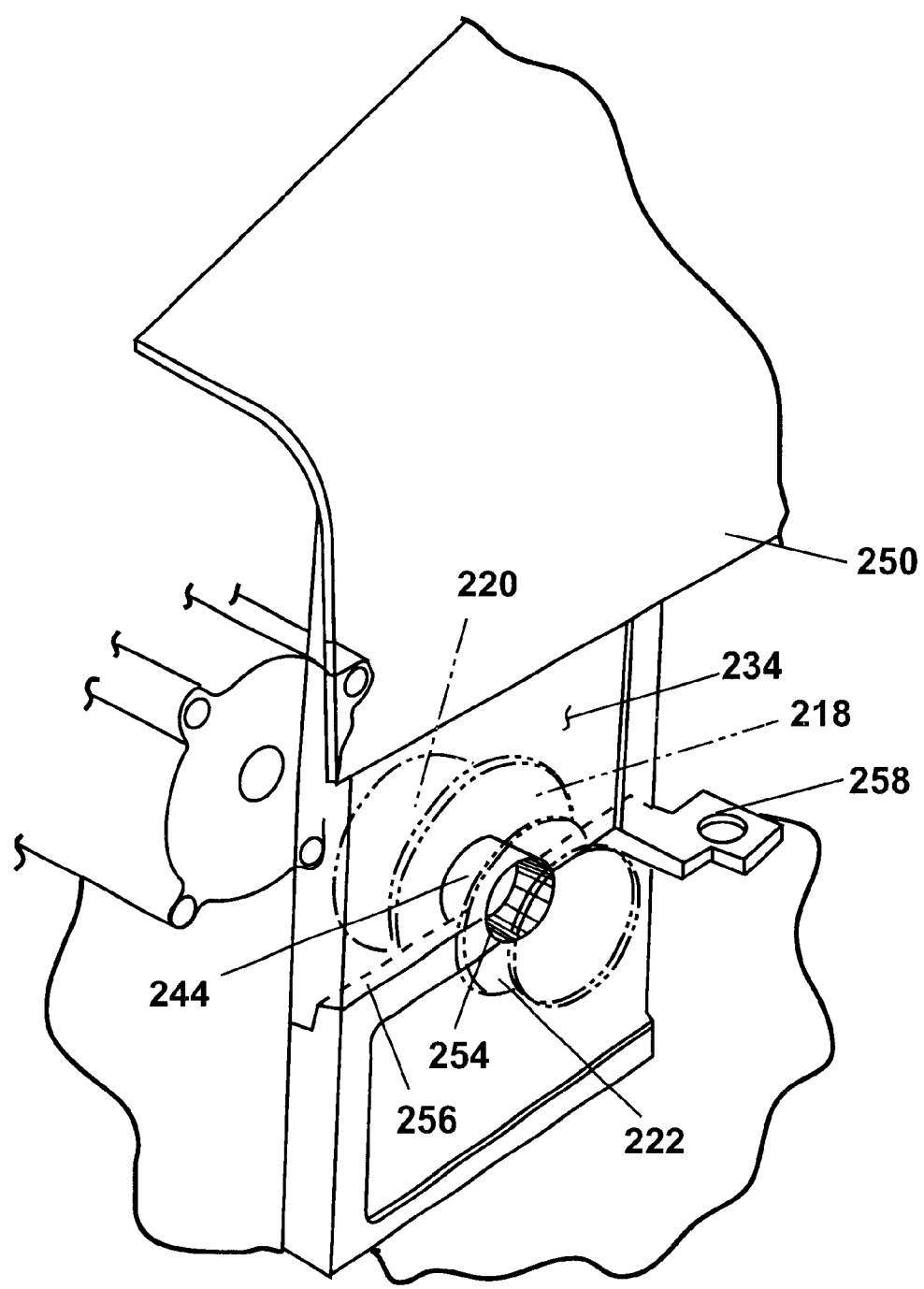
FIG. 9 is a partial perspective view of the belt access door assembly of the extraction cleaning machine of FIG. 1.

As best shown in FIGS. 5–6, 9, the timing belt 208 is reeved through a pulley 216 mounted at one end of the brush 206 and a pulley 222 on the interim drive shaft 200 of the pump 202, which includes a separate pulley 220 through which is reeved the stretch belt 204, which, in turn, extends around the drive shaft 198 of the motor 196. As best shown in FIGS. 7 and 9, the radius of the pulley 220 is larger than the radius of the pulley 222. Further, the pulley 220 has a convex cross section of its periphery, whereby it is adapted to receive the smooth stretch belt 204, while the pulley 222 has a toothed perimeter adapted for registration with the teeth in the timing belt 208.

Figure 5A:
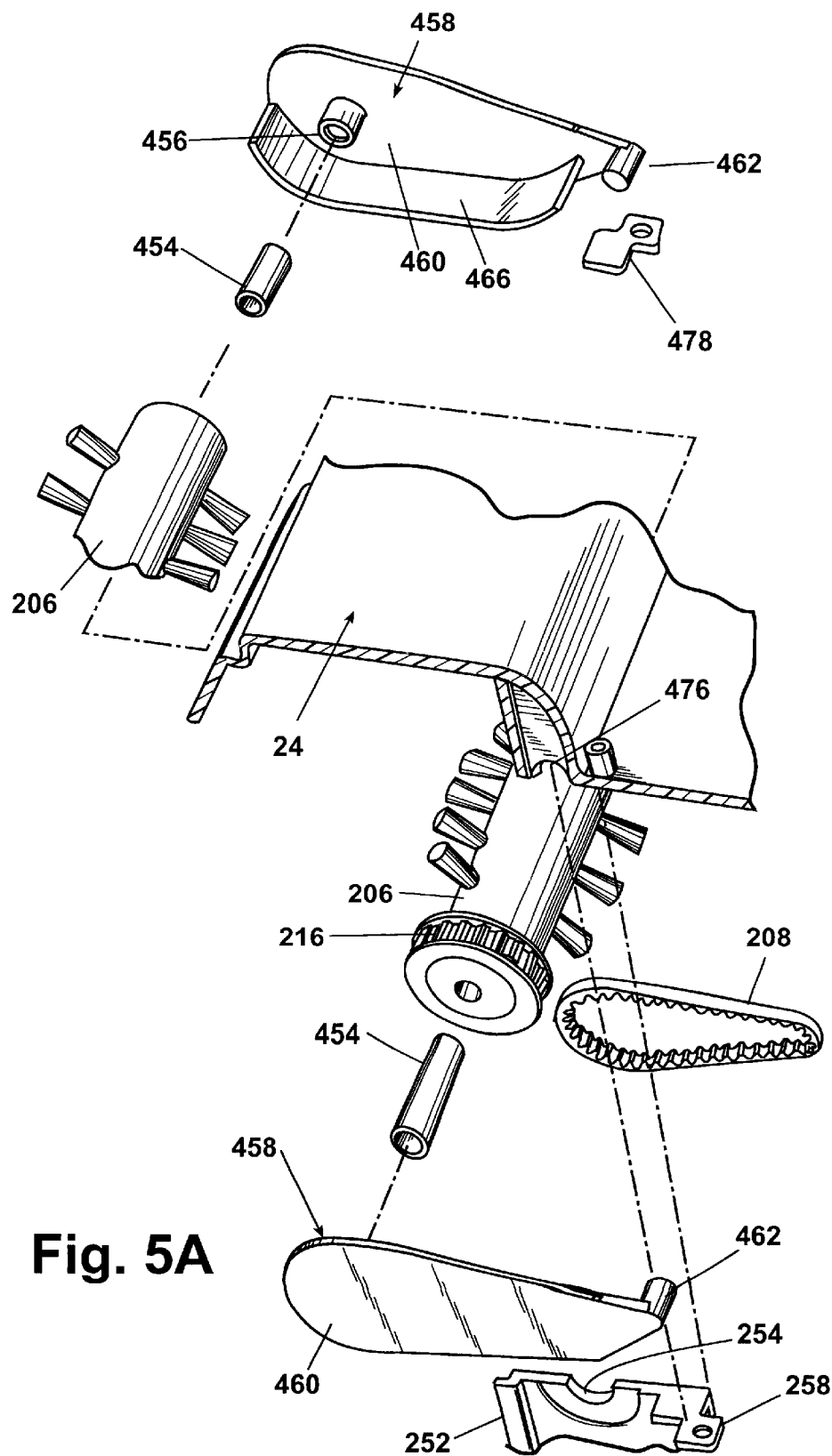
FIG. 5A is an exploded view of a floating brush assembly for the extraction cleaning machine of FIG. 1.

The pivot pins 462 of the arm member 458 are rotatably supported secured in a bearing (not shown) mount integrally formed with an internal wall of the agitation brush housing 26. Further, the pivot pins 462 are held in the bearing by a support 478 on the non-belt side of the base module 14 and the an arm 258 of the second belt access door 252 on the belt side of the base module, as best shown in FIG. 5A. Both the arm 258 and support 478 are secured to the agitation brush housing 26 by a conventional fastener (not shown) inserted through an aperture in each part. The arm members 458 are preferably limited in their downward movement relative to the agitation brush housing 26 by the length of the timing belt 208 as well as the engagement of the brush guards 466 with the arm 258 and the support 478. As the floating brush assembly 400 extends further and further downwardly, the belt 208 will stretch and resist further downward movement. Eventually, the brush guards 466 on each arm 458 will contact respectively the arm 258 and the support 478, which prevents any further downward movement.

With this floating agitation brush assembly 400, the cleaning machine 12 according to the invention can almost instantaneously adapt to varying carpet naps or other inconsistencies on the surface being cleaned. The arm members 458 also allow the rotating brush 206 to drop below the normal floor plane, as shown in FIG. 6, to, for example, provide contact with a bare floor.

Figure 5B:
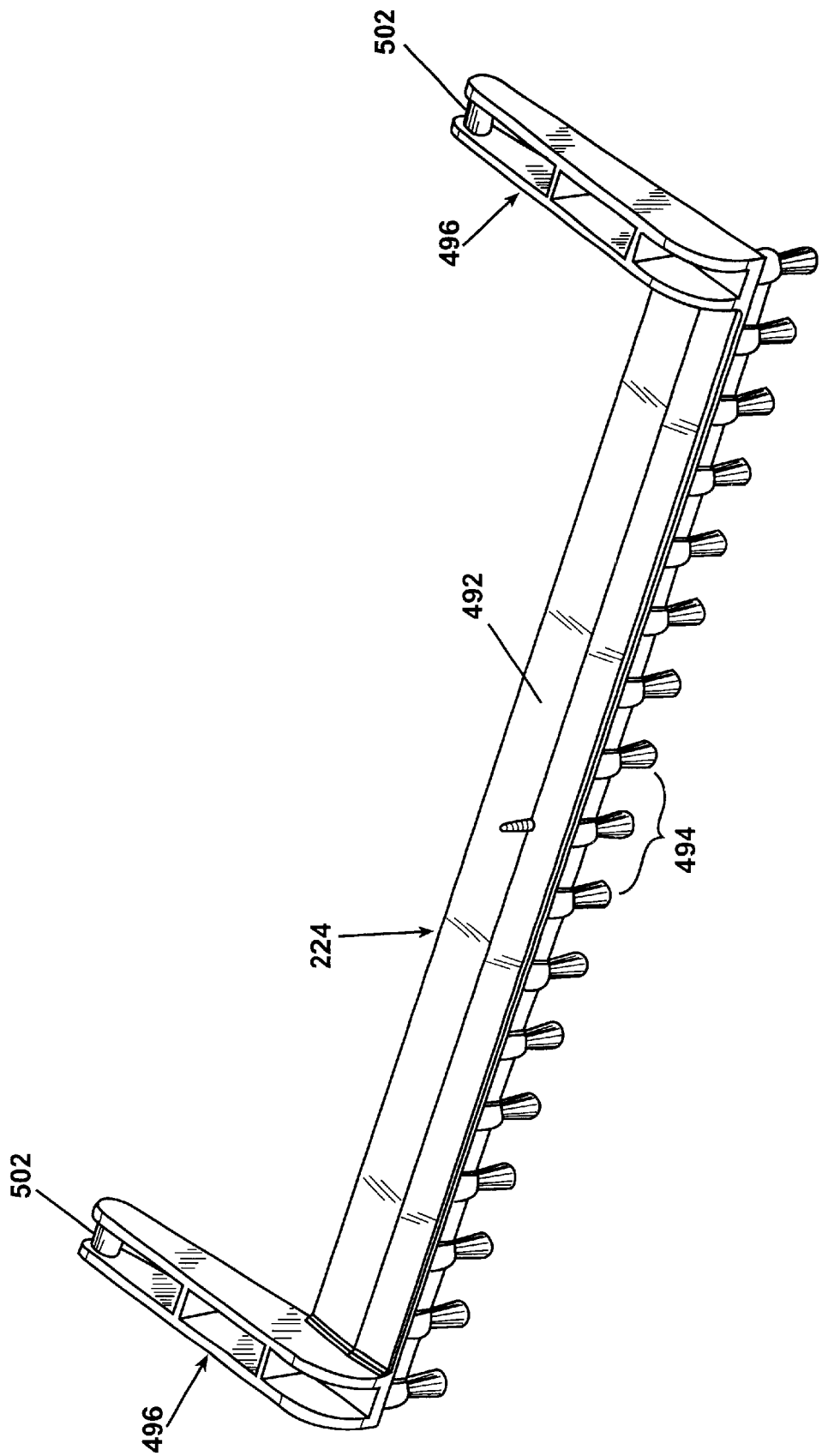
FIG. 5B is a perspective view of an alternative brush assembly for the extraction cleaning machine of FIG. 1.

As an alternative to the floating, rotatably mounted agitation brush 206, a floating strip agitation brush 224 could be incorporated into the cleaning machine 12, as seen in FIG. 5B. In this embodiment, the strip brush 224 comprises a linear brush portion 492 with bristles 494 extending downwardly therefrom, and a pair of integrally molded arms 496 having pivot pins 502, which can mount to the arm members 458 in place of the pivot pins 462 supporting the agitation brush 206. With this structure, the strip brush 224 can move vertically in response to changes to the carpet nap or other inconsistencies in the floor being cleaned.

As shown in FIGS. 2, 5 and 6, an elevator assembly 410 comprises a central support member 412 having at one end an L-shaped actuating arm 418, and at another end, the ramped surface 414 on a forward arm 404 opposed by a guide 416. Between the guide 416 and the ramped surface 414 is mounted a spring assembly 406, which biases the assembly 410 rearward toward the handle assembly 16. The spring assembly 406 includes a spring 436; a stop 426, which is attached to the base module 14 and through which the forward arm 404 travels; and a flange 428, which is integral with the forward arm 404. The spring 436 is held between the flange 428 and stop 426, and biases the assembly 410 rearward relative the stop 426 through force on the flange 428.

The arm 418 extends from within the base module 14 where it is mounted, through an aperture 402, towards the handle assembly 16. The actuating arm 418 is forced horizontally forward when the rotatably mounted handle 16 on the base module 14 is put in the upright position, which forces an upper portion 422 of the actuating arm 418 in a horizontal and forward direction. More specifically, as shown in FIG. 5, a curved surface 424 on the handle assembly 16 strikes a rounded distal end 420 of the L-shaped actuating arm 418 when the handle assembly 16 is put in its storage or non-use position. When the handle assembly 16 is pivoted rearwardly for use, as shown in FIG. 6, the curved surface 424 shifts rearwardly and the spring-biased elevator assembly 410 follows, with end 420 riding the curved surface 424, until the elevator assembly 410 reaches a rearward, rest position.

Thus, forward movement of the actuating arm 418 forces the support member 410 and ramped surface 414 forward, wherein the ramped surface 414 contacts the underside of the brush guards 466 on each arm 458, thereby raising the floating brush assembly 400 as the elevator assembly 410 moves from a rearward position to a forward position in the base module 14. That is, as the ramped surface 414 moves towards the front of the base module 14, the agitation brush assembly 400 slowly rises as the brush guards 466 ride the ramped surfaces 414. Such a construction eliminates the need for a manual arm for lowering and raising the agitation brush assembly 400 for storage or use of the accessory hose 22, thereby eliminating risks of damage to the brush assembly and protecting the carpet from the agitation brush assembly 400 resting thereon. When the handle 16 is moved to the in-use position, the spring assembly biases the elevator assembly to its normal, rearward position.

Figure 4:
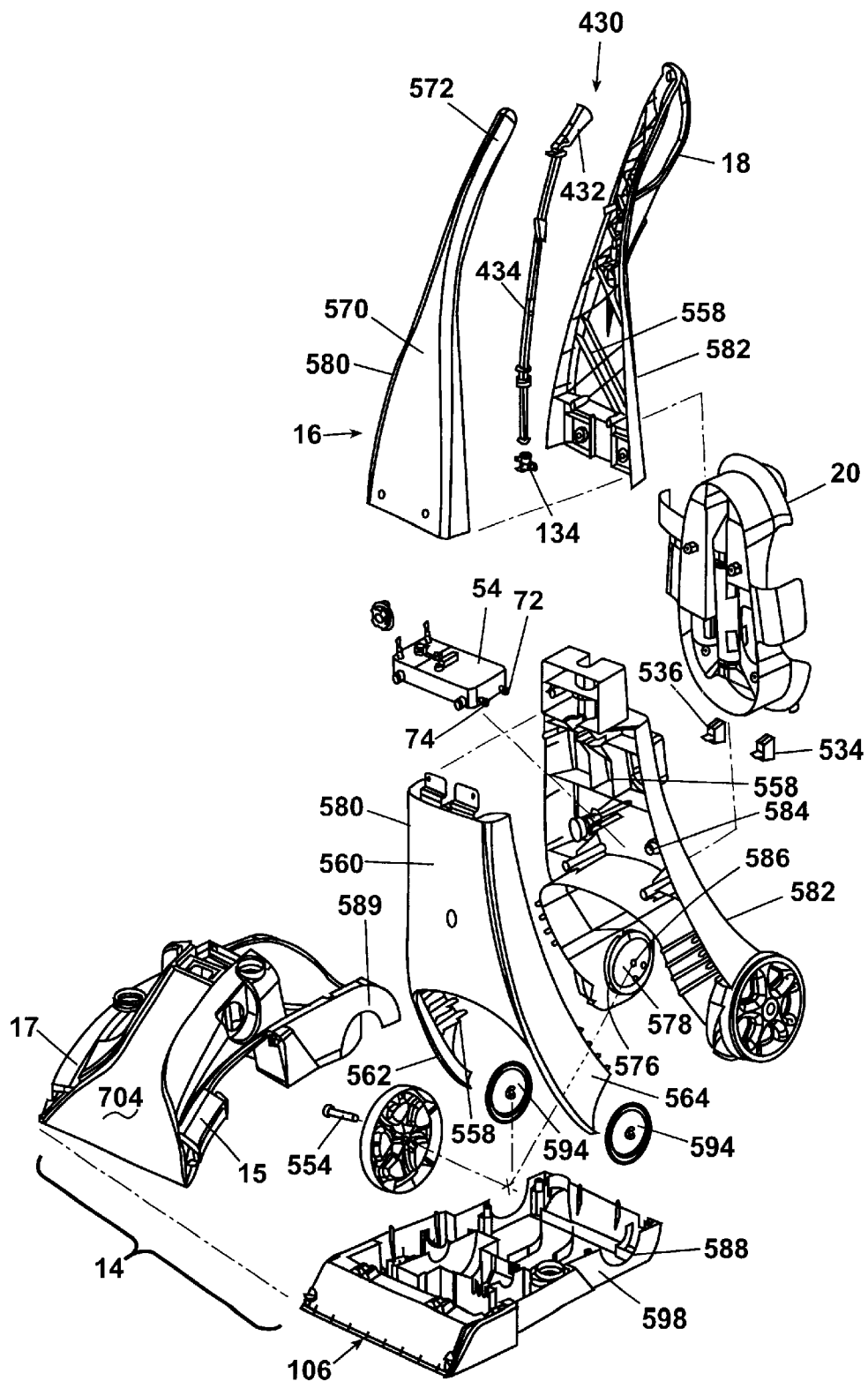
FIG. 4 is an exploded view of a handle assembly and portions of the base module for the extraction cleaning machine of FIG. 1.

As seen best in FIGS. 1 and 4, the base module 14 is supported at the rear portion thereof by a pair of opposed rear wheels 552. The handle assembly 16 includes a U-shaped lower portion 560 having opposed arms 562 and 564 including cylindrical bearings 578 for mounting the handle assembly 16 to the base module 14 and supporting axles 554 on a common axis for rotatably mounting the wheels 552 to the extraction cleaner base module 14. More particularly, the handle assembly 16 tapers from its wide, lower portion 560 to a thinner handle portion 570, having a thin handgrip portion 572, including the closed loop grip 18 at its uppermost end, by which the user moves the extraction cleaner. The bearing 578 include a central circumferential groove 576 for receiving arcuate portions 588, 589 of the base module 14 whereby rotation of the handle assembly 16 is facilitated.

The handle assembly 16 further comprises a front portion 580 and a rear portion 582 defining a substantially hollow interior supported by multiple ribs 558. Mounts 584, disposed radially on the interior of the front and rear portions 580 and 582 support an in-line heater 54, as will be described in detail below. The substantially flat front portion 580 is secured to the mated rear portion 582 by conventional fasteners, such as screws. The rear portion 582 further includes the combined accessory hose and electrical cord mount 20.

Returning to the lower portion 560, the arms 562, 564 comprise portions of both the front portion 580 and the rear portion 582. When the assembly 16 is secured together, these arms 562, 564 pivot about the bearing 578 integrally formed with the arms 562, 564. The bearings 578, in turn, receive axles 554, on each side, respectively, for mounting wheels 552. The axles 554 extend through the wheels 552, apertures 586 through the rear portion 582 of the lower arms 562, 564, and the bearings 578 integrally formed with the arms 562, 564. The axles 554, 556 are secured by large diameter axle mounting clips 594, disposed, when installed, adjacent the bearings 578 and within the base module 14. Each side edge 598 of the extraction cleaner base module 14 includes an arcuate surface 588 to accommodate the handle bearings 578 secured on inside portions of each arm 562, 564 of the rear portion 582. As shown in FIG. 4, the bearings 578 have a diameter that is relatively large when compared to the axles 554.

Once the handle assembly 16 is mounted to each base module 14, with the axles 554 secured by the mounting clips 594, the extraction cleaner upper housing portion 17 is secured to the lower housing portion 15. The upper housing portion 17 also has an arcuate surface 589 formed in each side thereof for accommodating and securing the integral bearings 578 of the arms 562, 564. More specifically, the arcuate surfaces 588, 589 of each of the side walls of the housings 15, 17 each form a socket that is received in the central circumferential groove 576 formed in the circumference of each integral bearing 578. Thus, when the base module 14 is formed of the housings 15, 17, the bearings 578 of the arms 562 are secured therebetween such that they can only rotate between an upright, stored position and an in-use position and the wheels are mounted to axles 554,556 received through apertures in the bearings 578 and secured by mounting clips 594.

The concentric wheel axle and handle pivot transfers all the force on the handle assembly 16 to the wheels 552 to keep downward force on the suction nozzle 34 constant. Further, the tank assembly 50, as shown in FIG. 3, center of gravity is close to the wheel center so that changing tank volume does not alter the downward force on the suction nozzle 34 and allows the weight of the tank assembly 50 to be carried on the wheels 552 fairly evenly. Also, the handle assembly 16 supports very little weight and therefore keeps the weight that the user feels through the handle assembly 16 to a minimum. This creates an upright extraction cleaning machine 12 that is easy to use and less tiring for the operator.

The handle assembly 16 is releasably locked against rotation from its upright position by a latch assembly 21, which is pivotably mounted to the rear portion of the base module 14 adjacent the rotational union of lower leg 564. The latch assembly 21 includes an upright lower portion which is pivotally mounted to the base module 14 at a rear corner thereof and an upper portion which extends upwardly and rearwardly of the lower portion. A molded-in spring arm extends rearwardly from the lower portion of the latch assembly 21 and bears against a rear portion of the base module 14 to bias the lower portion forwardly and against the rear portion of the lower leg 564. The upper end of the lower portion of the latch assembly 21 forms a horizontal latching surface which bears against the rear portion of the lower leg 564 and engages projections thereon to lock the handle in the upright position in a conventional fashion. Thus, as the handle assembly 16 is pivoted upright, the rear portion of the lower leg 564 rides along the horizontal latching surface until the edge catches the projection on the rear portion of the lower leg 564, at which point the handle assembly 16 is locked upwardly. To release the latch assembly 21, the user pushes the step downwardly and against the bias of the molded-in spring to release the horizontal latching surface from the projection. The latching mechanism is conventional and forms no part of the invention of this application. Any conventional latching mechanism can be used with the handle and base module in the invention.

The tank assembly 50 is removably supported on the rear of the base module 14. An air/water separator lid 700 seals the top of the tank assembly 50, which includes a valve mechanism 80 on a bottom portion for controlling the flow of cleaning solution fluid from the fluid supply chamber 49. The base module 14 includes a valve seat 88 complementary to the valve mechanism 80, and the bottom portion of the tank assembly 50 and the valve seat 88 are substantially complementary to one another so that the upwardly extending valve seat 88 is substantially surrounded by and received in the bottom of the tank assembly 50, as will be described further below.

Figure 16:
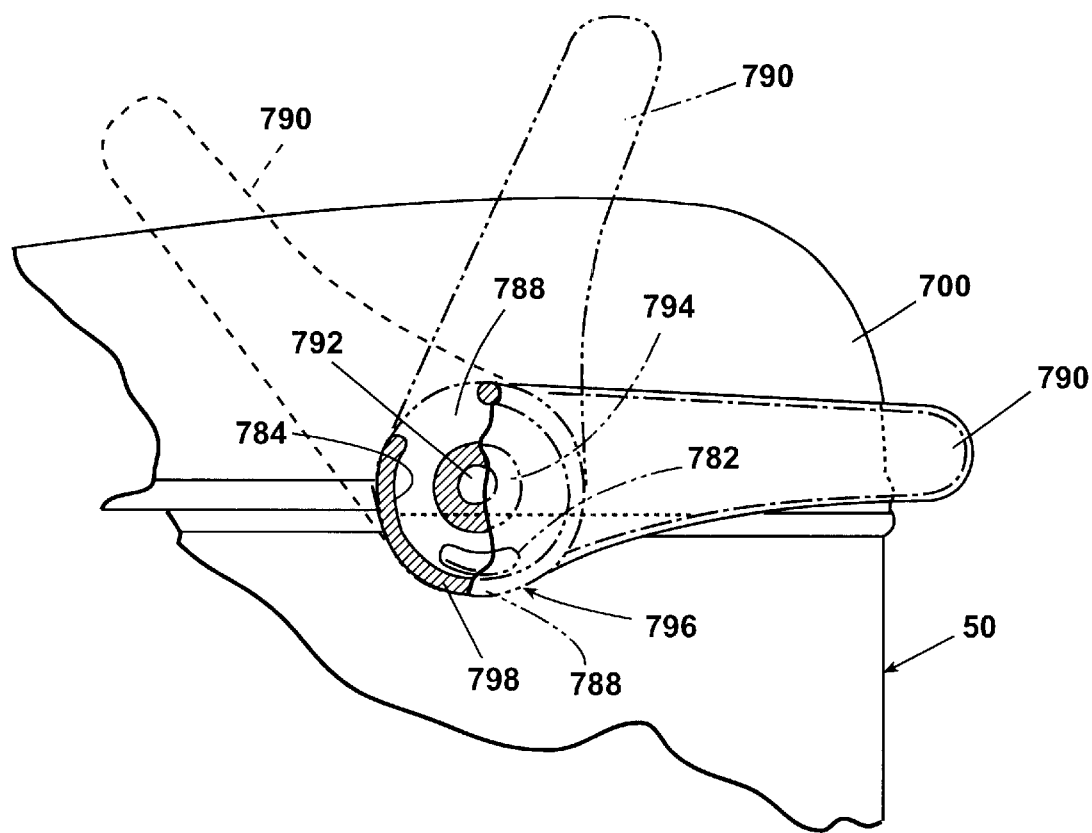
FIG. 16 is a partial sectional view of the tank assembly and handle assembly of the extraction cleaning machine shown in FIG. 1.

The lid 700 is secured to the tank assembly 50 by a rotatable handle 790, as best shown in FIG. 16, which can be moved between a storage position, in which the tank 50 is sealed by the lid 700 and the handle 790 is disposed rearwardly horizontal (as shown in solid lines); a transport position, in which the tank 50 is sealed and the handle 790 extends vertically upward (shown in phantom lines) for ease in carrying by the user; and a service position, in which the lid 700 can be removed from the tank assembly 50 and the handle 790 is disposed forwardly at an acute angle relative the lid (shown in dashed lines). The U-shaped tank handle 790 rotates about a pivot 792 projecting from a side of the lid 700. The pivot 792 is received in a bushing 794 disposed centrally in a circular mounting portion 796 at the ends of the handle 790. An arcuate wall 798 extending transversely from the mounting portion 796, integral therewith, and having an opening 788 surrounds the bushing 794. When the handle 790 is rotated about the pivot on the lid, an inside surface 784 of the wall 798 engages a tab 786 extending transversely from an upper lip 782 of the tank assembly 50 for locking the lid 700 to the tank assembly. The surface 784 of the wall 798 engages the tab 786 when the handle 790 is in either the storage or transport position. When in the service position, the tab 786 is aligned with the opening 788 in the wall 798, whereupon the lid 700 can be removed from the tank assembly 50.

Figure 14:
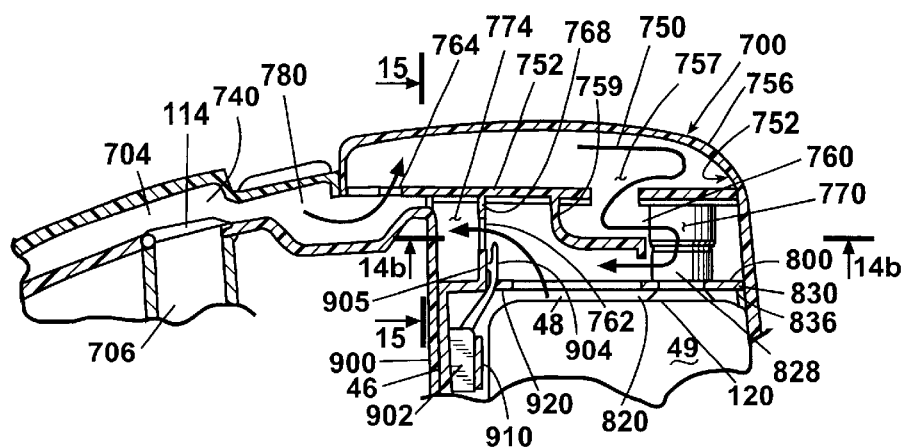
FIG. 14 is a sectional view of the air/water separator lid along line 14—14 of FIG. 3.
Figure 15:
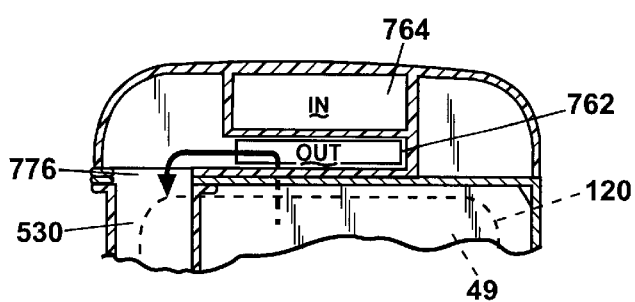
FIG. 15 is a sectional view of the air/water separator lid along line 15—15 of FIG. 14.

As best shown in FIGS. 3, 14, 15, a flexible bladder 120, which is used as a clean water reservoir, is mounted inside a rigid tank assembly 50. Thus, the tank assembly 50 is divided into two fluid chambers by the bladder 120: a fluid supply chamber 49, comprising the interior of the bladder 120, and a fluid recovery chamber 48, comprising the volume between the flexible bladder 120 and the rigid walls of the tank housing 46. The bladder 120 is molded from a pliable thermoplastic material and is collapsible when empty to accommodate recovered fluid in the volume between the bladder 120 and the tank housing 46. Initially, the bladder 120 is full of water or cleaning solution and occupies the vast majority of the volume within the tank housing 46. As the user sprays the cleaning solution onto the surface to be cleaned, the volume of fluid in the bladder 120 is reduced corresponding to the volume of solution sprayed on the surface. During suction, recovered dirt and water are received in the tank housing 46 in the volume between the bladder 120 and the tank housing 46. The volume available in the bladder 120 due to application of the cleaning solution is made available to recovered fluid by the pressure of the recovered fluid collapsing the bladder 120, thereby forcing air out of the bladder 120. Because recovery of the used cleaning solution is always less than 100% of the solution applied, there will always be ample room inside the tank housing 46 once the cleaning solution has been applied to the surface.

Figure 17:
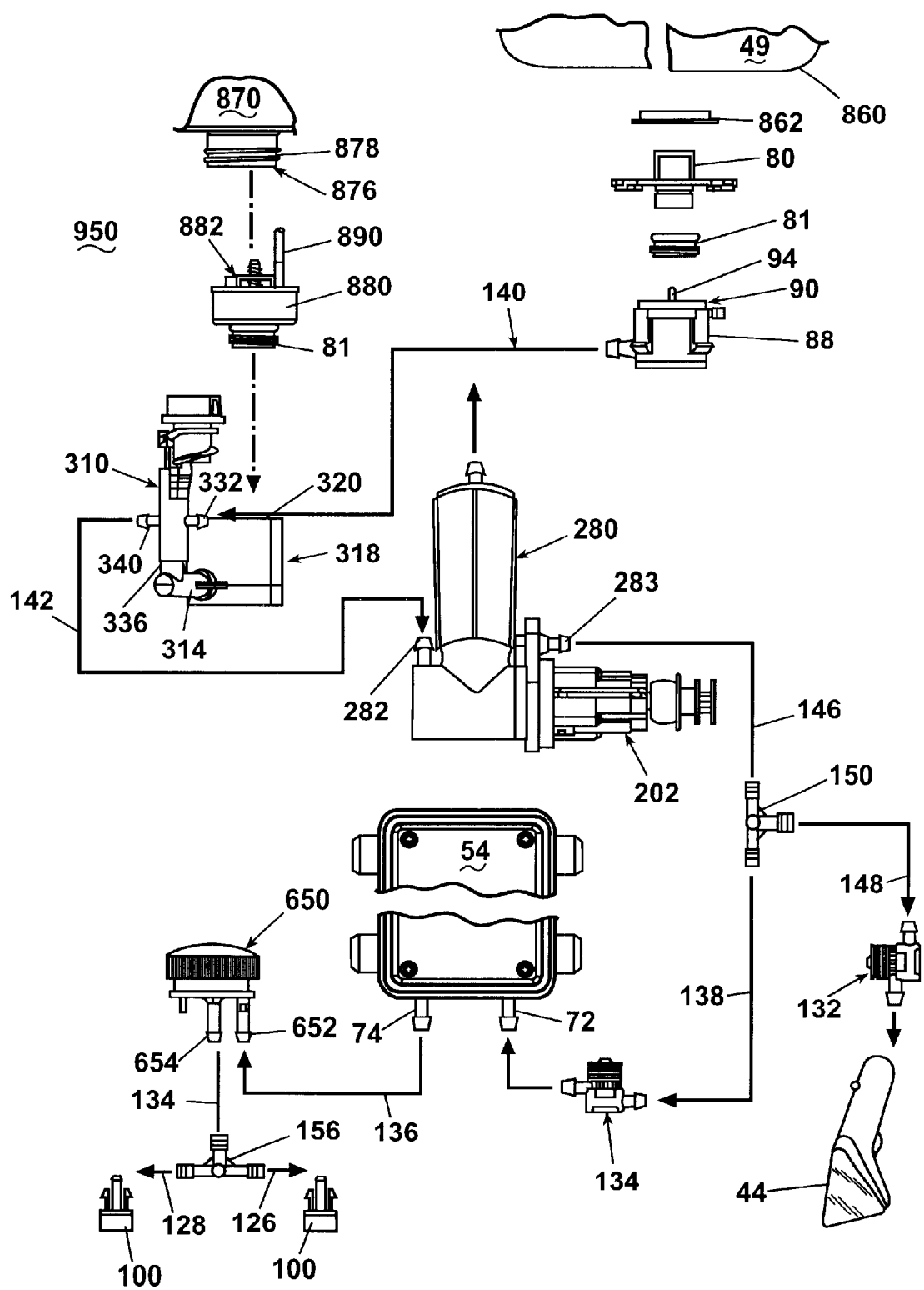
FIG. 17 is a fluid flow diagram for the extraction cleaning machine of FIG. 1.

The bladder 120 is disposed within the tank assembly 50 between a bottom surface 860 of the rigid tank housing 46 and a snap-in baffle plate 800, which will be explained in further detail below. An aperture 824 in the baffle plate 800 has a diameter approximately matching that of a small diameter end 125 of a funnel-shaped filling spout 124 of the bladder 120. Further, an upstanding collar 828 surrounds the aperture 824. A cylindrical shroud 770, as best shown in FIG. 17, is mounted on the inside of the air/water separator lid 700 and extends downwardly therefrom to capture the filling spout 124. Thus, the increasing diameter outside surface of the funnel-shaped filling spout 124 is retained in the aperture 824 and supported by the collar 828, thereby holding the flexible bladder 120 in an upright position in the tank housing 46 between the bottom surface 860 and the baffle plate 800 therein. As space between the upstanding collar 828 and the downwardly extending shroud 770 defines a fluid passageway between the fluid supply chamber 49 and the recovery chamber 48, whereby the fluid supply chamber 49 and the recovery chamber 48 maintain the same pressure, negative or otherwise.

The flexible bladder 120 includes an outlet 130 disposed in a lower corner of the flexible bladder 120. The outlet 130 is mated with an outlet aperture 862, as best viewed in FIG. 16, in the bottom surface 860 of the rigid outer shell for supplying fluid to a fluid application system 950 and securing the bladder 120 to the rigid bottom surface 860 of the tank housing 46.

The funnel-shaped filling spout 124 of the bladder 120 facilitates filling the bladder 120 and equalizing air pressure between the fluid supply chamber 49 and recovery chamber 48. The filling spout 124 is always open, so as to vent air from the bladder 120 as it collapses in volume and the usable volume within the rigid outer walls of the tank housing 46 expands in volume. Further, the open filling spout 124 ensures that both chambers 48, 49 are at substantially the same atmospheric pressure, which is preferably negative relative to standard atmospheric pressure because of the communication of the vacuum source 40 to the tank assembly 50 via the air/water separator lid 700, as will be explained further below. The volume of the bladder 120 is preferably one gallon.

As best shown in FIG. 17, the valve mechanism 80 is provided within the outlet aperture 862 through the bottom surface 860 of the tank housing 46 and the aligned outlet 130 in the bladder 120 for controlling the flow of cleaning solution fluid from the fluid supply chamber 49. The valve mechanism 80 comprises a valve member (not shown) mounted within the aligned aperture 862 and outlet 130, which together are selectively covered by the valve member to enable or prevent the flow of fluid to the fluid application system 950.

The base module 14 includes a valve seat 88, shown best in FIG. 17, that has a fluid reservoir 90 adapted to receive fluid through the fluid aperture 862 and conduct this fluid to one end of the conduit 140, the other end being mounted to a clean water inlet 332 of a mixing valve assembly 310. The bottom wall 860 of the tank housing 46 and the valve seat 88 are substantially complementary to one another so that the upwardly extending valve seat 88 is substantially surrounded by and received in the bottom wall 860. A projection 94 is provided in the fluid reservoir 90 and is adapted to contact a head of a shaft of the valve member (not shown). A spring received on the shaft of the valve member is adapted to bias the valve member into the closed position thereby preventing the flow of fluid through the fluid apertures. When the tank housing 46 is seated on the base module 14, the head of the valve member contacts the projection 94 and deflects the valve upwardly thereby permitting the flow of fluid around the valve, through the fluid apertures into the fluid reservoir 90 of the valve seat 88, and to the fluid application system 950. A gasket 81 seals the junction between the valve mechanism 80 and the seat 88. When the tank housing 46 is removed from the base module 14, the projection 94 is removed from contact with the head 96 of valve member. Therefore, the spring biases the valve downwardly into the closed position thereby preventing the flow of fluid through the fluid aperture 862 to the fluid application system 950.

The fluid application system 950 conducts fluid from the fluid supply chamber 49 to fluid dispensing nozzles 100, which are mounted in the brush housing 26 of the base module 14, and a fluid dispensing nozzle (not shown), which is mounted on an accessory cleaning tool (not shown), as best illustrated in FIG. 17. From the fluid supply chamber 49, clean water is conducted through conduit 140 to an inlet 332 to the mixing valve assembly 310, which also includes a detergent inlet 336 that is fluidly connected to a detergent supply tank 870 by a conduit 314. Mixed detergent and clean water form a solution that exits the mixing valve assembly 310 via an outlet 340, which is fluidly connected by a conduit 142 to a pump priming system 280 disposed adjacent the pump 202. An inlet port 282 for the pump priming system 280 is connected to the conduit 142, and pressurized fluid is expelled from the pump 202 through a pump outlet port 283, which is fluidly connected via a conduit 146 to a T-connector 150. The T-connector 150 supplies pressurized fluid to both the accessory tool (not shown) and the heater 54 via conduits 148, 138, respectively. The conduit 148 includes a grip valve 132 by which the user can manually displace a valve member, thereby enabling the flow of non-heated, pressurized fluid to the spray tip on the accessory tool.

The conduit 138 includes a trigger valve 134 having a displaceable valve member actuable by a trigger assembly 430, as best shown in FIG. 4, for selectively supplying the in-line heater 54 with pressurized cleaning solution. The trigger assembly 430 includes a switch 432 mounted conveniently within the closed loop grip 18 of the upright handle assembly 16, through which the user can depress the switch for actuating a manual link 434 for displacing the valve member in the trigger valve 134, thereby allowing fluid to flow to the inlet port 72 of the in-line heater 54.

Heated while passing through the heater 54, the fluid exits the in-line heater 54 via an outlet port 74, which is fluidly connected via a conduit 136 to an inlet 652 for a flow indicator 650. An outlet 654 for the flow indicator is fluidly connected to a T-connector 156 via a conduit 134. The T-connector 156 supplies fluid dispensing nozzles 100, which are mounted in the brush housing 26 of the base module 14, and supplied with heating cleaning solution via conduits 126, 128.

A detergent supply tank 870, as best illustrated in FIG. 3, is received within a well formed in the upper housing 19 of the base module 14. The supply tank 870 includes a top surface 872 shaped complimentary to the exterior of the upper housing 17. A bottom surface 874 of the supply tank 870, as best shown in FIG. 17, includes an aperture 876 surrounded by a threaded spout 878, which receives a mated threaded cap 880 having a valve mechanism 882 therethrough. The valve mechanism 882 will not be described here as its structure and function mimics that valve mechanism 80 described above for the tank assembly 50, as it too seats on a projection 94 in a valve seat 318 for displacing the valve mechanism 882. The valve seat 318 of the mixing valve assembly 310 includes a fluid reservoir 320 for receiving and conducting fluid to one end of an L-shaped conduit 314, the other end being mounted to a detergent inlet 336 of the mixing valve assembly 310. The threaded cap 880 also includes an air return conduit 890 mounted therethrough for equalizing the pressure inside the detergent supply tank 870 with the outside atmosphere.

Figure 10:
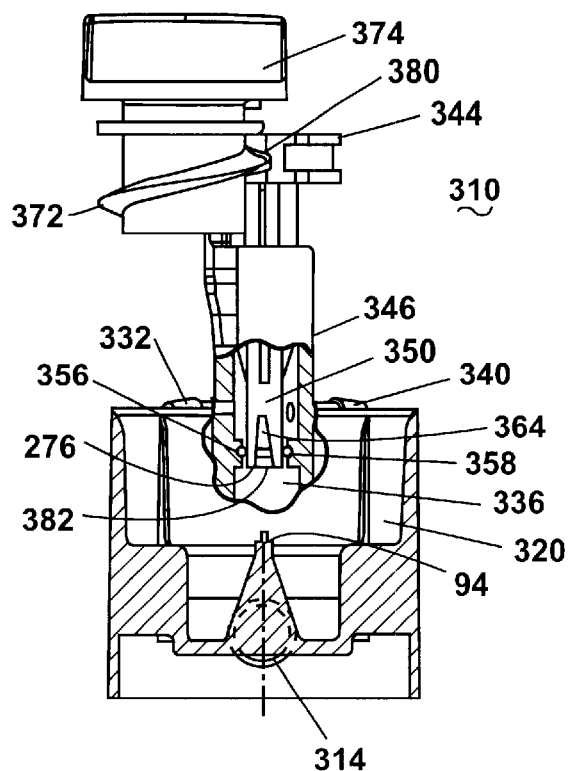
FIG. 10 is a partial sectional view of the auto-mix valve of the extraction cleaning machine of FIG. 1 with a valve stem in a first position.
Figure 11:
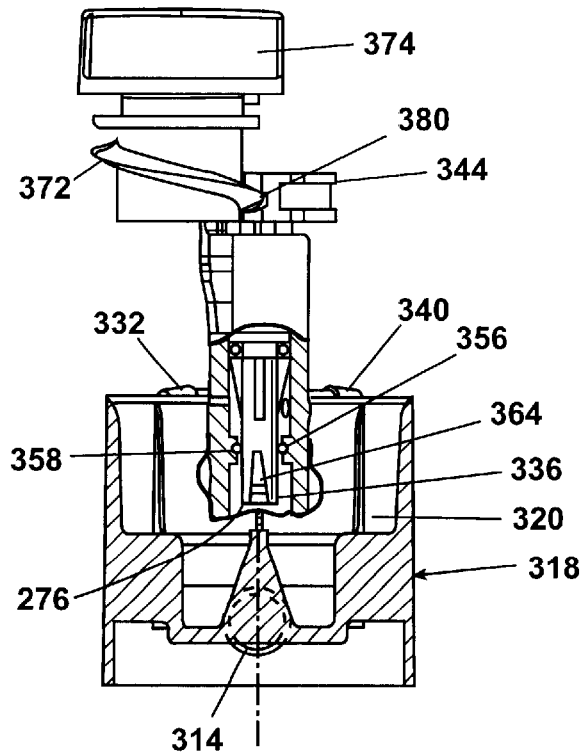
FIG. 11 is a partial view of the auto-mix valve of the extraction cleaning machine of FIG. 1 with a valve stem in a second position.

The mixing valve assembly 310 is positioned intermediate the tank assembly 50 and the solution pump 202. Preferably, the mixing valve 310 is a variable mixing valve to accommodate differing mixtures of detergent and clean water. As seen in FIGS. 10, 11 and 17, the variable mixing valve 310 comprises a valve body 330 having a clean water inlet 332 that is fluidly connected to the fluid supply chamber 49 and a detergent inlet 336 that is fluidly connected to a detergent supply tank 870 by the valve seat 318 and, via the fluid reservoir 320, the L-shaped conduit 314. The mixed solution outlet 340 is also formed on the valve body 330 and is adapted to conduct the clean water and detergent mixture, i.e., the cleaning solution, from the mixing valve 310 to a fluidly connected pump priming system 280 adjacent the inlet of the pump 202.

The valve assembly 310 includes an end cap 344 mounting a coaxial plunger 350 in a central body portion 346. The end cap 344 partially receives a thread 372 of a knob 374 such that the plunger 350 can be raised or lowered in the valve body 346 when the knob 374 is turned.

The plunger 350 includes an annular groove 356 formed in a distal end 276 thereof. The groove 356 is received within an 0-ring 358. The distal end 276 and O-ring 358 are adapted to create a fluid seal inside the circular valve body 346 when the plunger 50 is in its lowermost portion, as shown in FIG. 11, and define a mixing chamber 360 when the plunger 350 is raised from its lowermost position, as shown in FIG. 10.

The distal end 276 of the plunger 350 further includes a tapered groove 364, which is tapered so that the groove has a greater cross-sectional area immediately adjacent the head end 276 than it does a distance spaced upwardly therefrom. The tapered groove is positioned in the detergent inlet 336 opening to control the flow of detergent therethrough. That is, the tapered groove 364 accommodates varying flow rates of detergent from the detergent supply 870, through the conduit 318, and through the detergent inlet 336 into the valve body 346. The lower the plunger 350 is seated in the inlet 336, the less the area of exposure of the tapered groove 364 in the valve body 346, thereby limiting the flow of detergent thereto.

The control knob 374 is mounted on an outside wall of the upper housing of the extraction cleaner for controlling the water to detergent ratio in the cleaning solution delivered to the fluid application system 950. The control knob 374 is mounted adjacent the end cap 344 and includes a thread 372 that is received in a groove 380 of the end cap 344, so that turning the knob 374 lowers or raises the plunger 350 in the valve body 346. In a first position shown in FIG. 10, with the plunger 350 extended upwardly from the valve body 346, the maximum cross-sectional area of the tapered groove 364 is exposed to define an inlet aperture 382 into the valve body 346. Therefore, the maximum amount of detergent will be drawn into the valve body 346 to mix with clean water supplied via inlet 332, and ultimately discharged to the pump assembly 280 and fluid dispensing nozzles 100. The other extreme position of the plunger 350 lowers the tapered groove 364 from the mixing chamber 360 completely so if there is no aperture 382 and thus no fluid flow communication between the detergent inlet 336 and the valve body 346. Therefore, only water will be directed to the pump assembly 280 and spray tips.

As should be evident, rotation of the threaded knob 374 will provide an infinite number of detergent-to-water mixing ratios between the two extremes described above. In the preferred embodiment, however, the housing adjacent the knob 374 is marked with three concentration indicators: The first indicator is a water only or "rinse" position; second, a maximum detergent-to-water mixing ratio where the tapered groove 364 is fully exposed in the valve body 346; or third, a standard mixing ratio approximately half way between the extremes described previously. Of course, any variation of the indicated concentration positions can be employed by simply rotating the knob 374 to a position between any two indicated positions. The extreme positions are defined by the shape of the length of the thread 372, which includes opposite ends defining a pair of extreme positions for limiting the rotation of the knob 374 relative the cap 344.

In use, the knob 374 is intended to be positioned at the standard mixing ratio position for the vast majority of cleaning operations. When a high-traffic or heavily stained area is encountered, the knob 374 can be rotated to the maximum detergent position. If a clean-water rinsing operation is desired, then the knob 374 can be rotated to the water only position.

As best illustrated in FIG. 17, the mix of detergent and water is delivered via conduit 142 to the inlet port 282 for the pump priming system 280, which is disposed adjacent an inlet nose 288 of the pump 202. Thus, in operation, the drive motor 196 is activated, thereby imparting rotation through the drive shaft 198 to the interim drive shaft 200, and the pump 202 is primed, as will be explained below. Rotation of the interim drive shaft 200 causes the pump 202 to pressurize the fluid received from the fluid supply chamber 49, via the mixing valve assembly 310 and priming assembly 280. Further, rotation of the interim drive shaft 200 causes the agitation brush 206 to rotate. Pressurized fluid flowing from a pump outlet port 283 is conducted to the in-line heater 54, a flow indicator 650, and then a plurality of conventional fluid dispensing nozzles 100 provided near the front of the base module 14 adjacent the agitation brush 206. The pressurized cleaning solution sprays down onto the surface to be cleaned in a fan-shaped pattern extending substantially the entire width of the base module 14. A fluid outlet port 74 of the in-line heater 54 is also fluidly connected to a conduit 144, which is integrated into the accessory hose 22. Fluid flows through the conduit 144 to the accessory hose cleaning tool (not shown) provided at the terminal end of the hose 22. With this configuration, pressurized cleaning solution is available on demand for both the accessory cleaning tool and the fluid dispensing nozzles 100.

Referring to FIGS. 2, 5 and 6, the drive shaft 198 of the drive motor 196 is interconnected to the interim drive shaft 200 of the centrifugal solution pump 202 by the stretch belt 204, which allows dry, high speed operation and operates as a clutch during brush roll-jam conditions. The interim pump shaft 200 is interconnected to the rotatably mounted agitation brush 206 by the timing belt 208, which allows a slower, high torque wet operation.

The interim pump drive shaft 200 functions as an interim drive providing a step down from the drive shaft 198 to the stretch belt 204 and the timing belt 208 to the agitation brush 206. Because of the step down structure, the drive motor 196 can be a high efficiency, high speed motor (30,000 plus rpm), which is stepped down at the interim drive pump shaft (approximately 12,000 rpm), and further stepped down at the agitation brush 206 (approximately 3,500 rpm).

Figure 8:
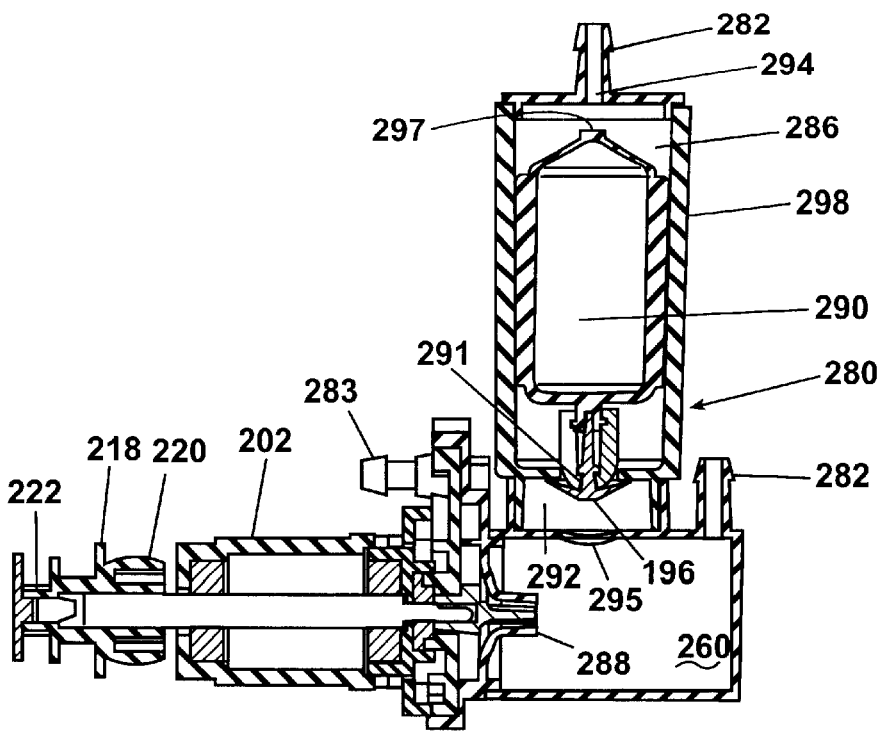
FIG. 8 is a side sectional view of the pump and pump priming assembly of the extraction cleaning machine of FIG. 1 with a plunger in a second position.

The pump shaft 200 includes the pair of coaxial spaced-apart pulleys 220, 222, as best seen in FIGS. 2, 8–9, for receiving each respective belt 204, 208, with a radially extending baffle 218 disposed between the pulleys so that the inwardly disposed stretch belt 204 is insulated from the wet environment in which the outwardly disposed timing belt 208 operates to drive the agitation brush 206. A barrier coplanar with the radial baffle 218 insulates the environments from each other as formed by the juncture of a pair of belt access doors 250, 252, as will be described below. The stretch belt 204 also functions as a clutch when the agitation brush 206 is jammed. Because the agitation brush 206 is connected to the interim pump drive shaft, and the interim pump drive shaft 200 is connected to the motor drive shaft 198, there must be some mechanism to provide relief to the motor 196 when the agitation brush 206 is jammed. This relief occurs at the drive shaft 198, which will turn inside the stretch belt 204 without rotating the stretch belt 204 when the interim pump shaft 200 stalls due to an agitation brush 206 jam.

As best shown in FIGS. 5–9, the timing belt 208 is structurally walled off from the stretch belt 204 by the barrier defined in part by the first belt access door 250, second access door 252, and the baffle 218. Removing the first belt access door 250 provides access to the timing belt 208 connecting the pump drive shaft 202 and the agitation brush 206. Access to the stretch belt 204 connecting the motor drive shaft 198 to the pump drive shaft 202 is provided only when the second belt access door 252, disposed within a brush housing 26, is removed. As illustrated in FIG. 2, the first belt access door 250, having a substantially L-shaped cross-section, includes a substantially vertical portion 266 and an angular, but substantially horizontal portion 264. As best shown in FIG. 9, the second belt access door 252 is rectangular, including an arcuate groove 254 in a front portion of a top surface 256 and a transversely extending arm 258 in a rear portion of the top surface. The arm 258 secures the second door 252 in place in the brush housing 26 and supports the pivot pin 462 on the pivot arm 460 of the floating brush assembly, as best shown in FIG. 5A.

More specifically, as shown in FIG. 2, the substantially vertical portion 266 of the first door 250 includes sides 240 that are received in a mated recess 242 surrounding an access aperture 236. Further, the first door 250 includes a depending flange 234 mounted to and spaced apart from a back portion of the door 250 and extending downwardly parallel to the door 250 and further including an arcuate groove 244 in a lower end. Each side of the substantially horizontal portion 264 includes a flexible tab 226 on each side that is received in a respective slot 228 disposed on the substantially horizontal face 222 of the upper housing 17 at each end of the access aperture 236 that receives the first belt access door 250. Thus, as the first belt access door 250 is slid into place, the depending flange 234 extends behind the upper housing 17 defining the access aperture 236, the sides are received in grooves 242 in the upper housing 17 surrounding access aperture 236, and the tabs 226 engage the slots 228 formed on the substantially horizontal portion 248 of the housing, whereby the first access door 250 is secured in place. The first access door 250 can be removed from the aperture 236 by flexing the tabs 226 inwardly to release them from their receiving slots 228. As shown in FIG. 9, the inner depending flange 234, including groove 244, mates with the radially extending baffle 218 between the pulleys 220, 222 on the shaft 200 and the arcuate groove 254 in the arm 258 of the second belt access door 252 to separate the motor/pump stretch belt 204 from the pump/agitator timing belt 208.

The pump priming system 280 is disposed adjacent the pump inlet nose 288, and draws from the fluid supply chamber 49 and the detergent tank 870. The fluid supply chamber 49 is under negative pressure because it is in fluid communication with the recovery chamber 48 and the vacuum source. Once primed, the pump 202 draws solution from the mixing valve assembly 310, and delivers the mixture to a spray tip 100 or an accessory tool 44 for spraying on the surface to be cleaned. When the pump 202 stops, the solution in the supply conduit is drawn into the low-pressure fluid supply chamber 49 and away from the pump 202. A centrifugal pump is incapable of developing sufficient pressure to prime itself by overcoming the negative tank pressure.

With reference to FIG. 7, a pump priming assembly 280 as described herein overcomes this problem. The pump-priming assembly 280, includes a priming chamber 260 for flooding the inlet nose 288 of the pump 202, an inlet port 282 for the chamber 260 that is fluidly connected to the nose 288 of the pump 202, and a pump outlet port 283. A vacuum port 284 is fluidly connected to the vacuum source 40, or a portion of the recovery chamber 48 that is in fluid communication with the vacuum source 40.

The pump-priming assembly 280 also includes a hollow valve body 298 having a plunger chamber 286 and a valve chamber 292. A valved opening 295 joins the valve chamber 292 and the priming chamber 260. An outlet opening 291 joins the valve chamber 292 and the plunger chamber 286. Also, an aperture 294 is formed at an upper inside portion of the valve body 298 to fluidly connect the valve body 298 and the outlet 284. An elongate buoyant plunger 290 having a top portion 297 at one end and a rubber umbrella valve 296 at the other is received for reciprocal movement inside the valve body 298. More specifically, the umbrella valve 296 reciprocates between the valved opening 295 and the outlet opening 291 and within the valve chamber 292. Thus, the plunger chamber 286 substantially houses the elongate plunger 290, while the valve chamber 292 houses the umbrella valve 296, which is coaxially attached to the elongate plunger 290 for reciprocal axial movement therewith.

In operation, the pump 202 will be primed with fluid from the fluid supply chamber 49 by activating the pump 202 and the vacuum motor 196, which will exert negative pressure on the vacuum outlet 284, thereby drawing any air out of the priming chamber 260 and plunger chamber 286, and further overcoming the negative pressure exerted on the fluid in the conduits 140, 142 connecting the fluid supply chamber 49 to the pump 202. The air will be drawn through the valve body 298 into the vacuum impeller fan housing 510. Preferably, the weight and dimension of the plunger 290 is coordinated with the amount of negative air pressure applied to the pump priming assembly 280 from the vacuum source 40 so that the negative air pressure applied to the plunger chamber 286 is insufficient by itself to draw the plunger 290 upwardly and seal the outlet opening 291

As the vacuum motor operates to draw the air from the system, fluid fills the chamber 260 and enters the chambers 292, 286. Eventually, the fluid level will fill the valve chamber 292 and rise inside the plunger chamber 286, pushing the plunger 290 upwardly causing the umbrella valve 296 to seal the outlet opening 291, thereby preventing water from rising further in the plunger chamber 286 and being sucked into the vacuum source 40. Because the pump nose 288 is submersed at this point, water enters the pump 202 and primes it. As the pump 202 sucks water from the priming chamber 260, the plunger 290 is drawn downward in the plunger chamber 286, and the umbrella valve 296 descends therewith in the valve chamber 292 to activate a seal in the opposite direction, as the umbrella valve 296 seats in the valved opening 295. The reverse seal prevents air from being sucked into the priming chamber 260 from the fluidly connected chambers 292, 286. This cycle repeats each time a trigger 432 in the closed loop handle 18 is activated or the unit is powered off and on again. Once the reverse seal has been established, the chamber 260 should remain filled, the nose 288 of the pump 202 flooded, and, thus, the pump 202 sufficiently primed for normal operation.

From the pump 202, the pressurized fluid flows through a conduit 146 to a T-connector 150 for supplying both floor nozzles 100 and an accessory tool 44. The T-connector 150 includes outlets 152, 154 for supplying both the in-line block heater 54, and a floor spray nozzle 64, or an accessory cleaning tool 44, respectively. Specifically, the first outlet 152 of the T-connector 150 is connected to fluid conduit 148 that is adapted to supply non-heated and pressurized cleaning solution to a spray nozzle (not shown) on an accessory cleaning tool (not shown) mounted at the terminal end of the accessory hose 22. The second outlet 154 is fluidly connected via a conduit 138 to the in-line block heater 54, shown best in FIG. 18.

Figure 18:
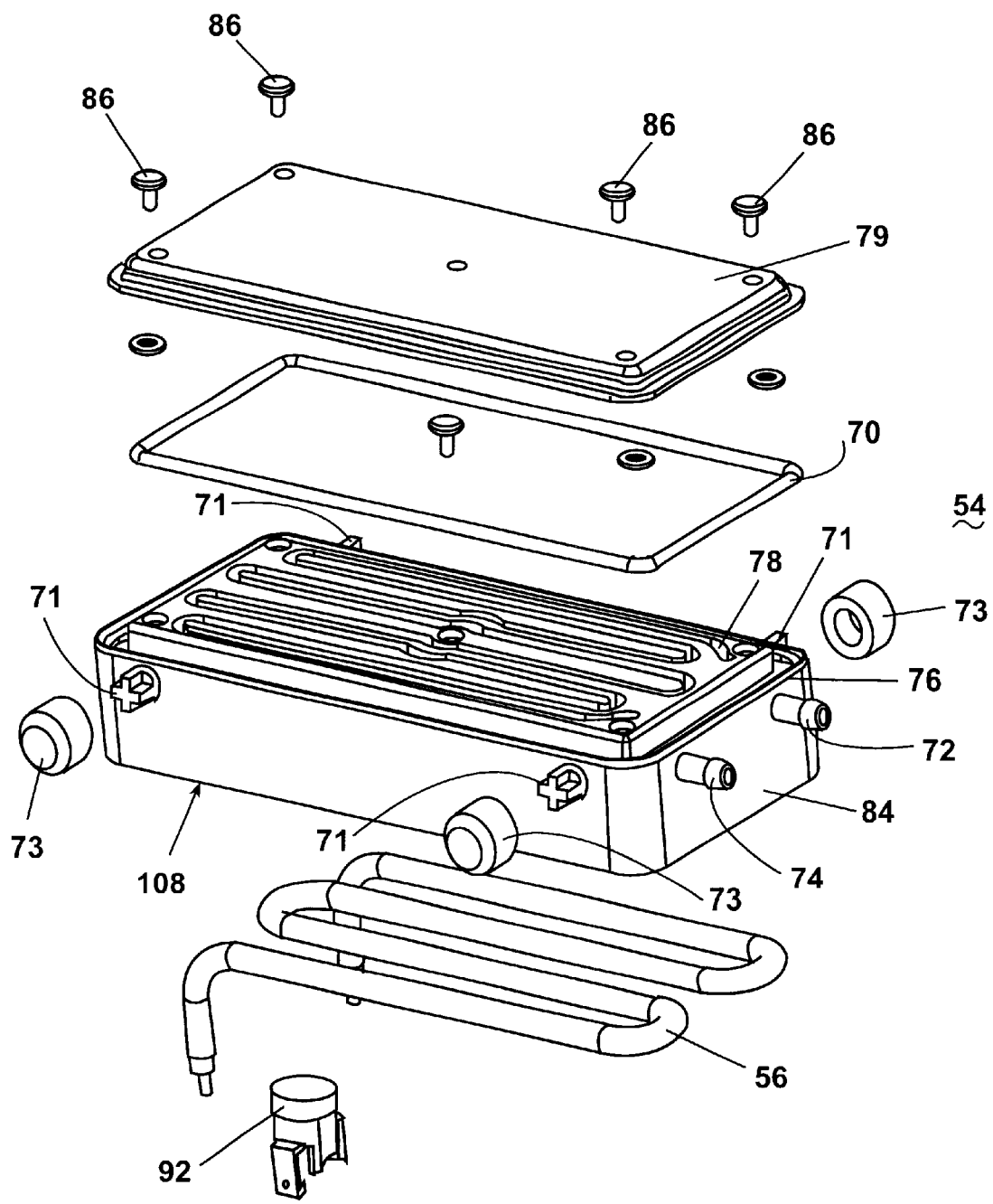
FIG. 18 is an exploded view of the in-line heater of the extraction cleaning machine of FIG. 1.

The in-line block heater 54 receives pressurized cleaning solution from the pump 202, via the T-connector 150, and further has a heating element 56 that is electrically connected to a source of electricity (not shown). As shown in FIG. 18, the heater 54 includes an aluminum body 84 having an inlet port 72, an outlet port 74, a heating element 56 disposed within the aluminum body 84, and a serpentine channel 78 disposed on a top face 76 of the block heater 54. A cover 79, via a gasket 70 seals the top face 76, and thus the channel 78, and fasteners 86. The heating elements 56 located in the aluminum body 84 of the block heater 54 uniformly heat the fluid as it passes through the channel 78 across the block heater 54. The channel 78 includes an outlet port 74 through which heated fluid exits the channel 78 to the conduit 136. The heater 54 is mounted within the handle assembly 16 via shafts 71 and plugs 73 to bosses (not shown) in the handle assembly 16.

The size of the aluminum body 84 and the heating elements 56 are selected to effectively deliver approximately 500 watts of power to the heating block 54 to heat the cleaning fluid in the serpentine channel 78 to a temperature of about 150–180° during the dry cycle of the cleaner and apply that heated cleaning fluid during the wet cycle, as will be described more completely below. Use of approximately 500 watts of power for the heater 54 leaves sufficient power from a convention 120 volt power line for the vacuum motor, agitation brush and pump while heating the solution to the target temperature with a minimal warm-up time of approximately one minute. To enhance this process, hot tap water (defined as approximately 110–120° Fahrenheit) can be dispensed into the reservoir from a household tap. The solution that passes through the in-line block heater 54 is heated approximately 30° to 35° to reach a target temperature of approximately 150° Fahrenheit. A thermostatic controller is preferably mounted to a face of the heater 54 to limit the block temperature to 180° F. The solution that passes to the upholstery attachments does not get the temperature boost. A non-heated solution is preferred for upholstery, which is more sensitive to heat damage.

Powered by approximately 500 watts, the in-line block heater 54 will boost the temperature of water 16° Fahrenheit on a continuous basis at 850 milliliters a minute. Since an approximately 30° temperature increase is desired, it is necessary to store heat energy in the aluminum body 84 of the in-line heater block 54 during the dry cycle and deliver it to the solution during the wet cycle. The recommended cleaning process with the extraction cleaning machine 12 described herein is two wet strokes, defined as movement of the extraction cleaning machine 12 while cleaning solution is sprayed from the nozzles 100 to the carpet being cleaned, followed by two dry strokes, defined as cleaning solution and dirt removal through the suction action of the suction nozzle 34. There is thus an opportunity to effectively deliver 1000 watts of heat energy to the solution by storing 500 watts during the dry cycle. Furthermore, a typical cleaning stroke is about 10 seconds maximum, so the heat reservoir must have the capacity to store 500 watts for approximately 20 seconds, which equals approximately 10,000 Joules of energy.

The heating element 56 is embedded into the aluminum body 84, which is of ample mass to store the energy at some temperature below the boiling point of water (212° Fahrenheit). The larger the mass of aluminum, the smaller the differential temperature needs to be to store the required energy. On the other hand, the larger the mass, the longer the initial heat-up period becomes. Thus, there is an optimal size of aluminum block that is calculated based on a thermostat shut-off point of 180° Fahrenheit. This block temperature keeps stagnant water from boiling and also heats the isolution that passes through the serpentine channels 78 on the block face 76 to a temperature of approximately 150° Fahrenheit before leaving the in-line block heater 54 through outlet port 74.

In operation, when the heater 54 is initially energized electrically, it heats to its thermostatically controlled shut-off temperature in approximately one minute. A thermostat 92 is included on a lower face 108 of the body 84. During use, the cleaning solution passes through the heating channel 78 in the in-line block heater 54, drawing energy from the aluminum body 84 and from the heating element 56 embedded therein adjacent the underside of the solution channel 78. The aluminum body 84 cools somewhat during the 20 second cycle and reaches a temperature slightly below its starting temperature. During the dry cycle, the aluminum body 84 is reheated to its previous temperature of approximately 180° Fahrenheit. The heated solution leaving the in-line block heater 54 is applied to the carpet after passing through the conduit 136 to the flow indicator 650, and the conduit 134 from the indicator 650 to the fluid dispensing nozzles 100, which are positioned between the agitation brush 206 and the suction nozzle 34.

Figure 20:
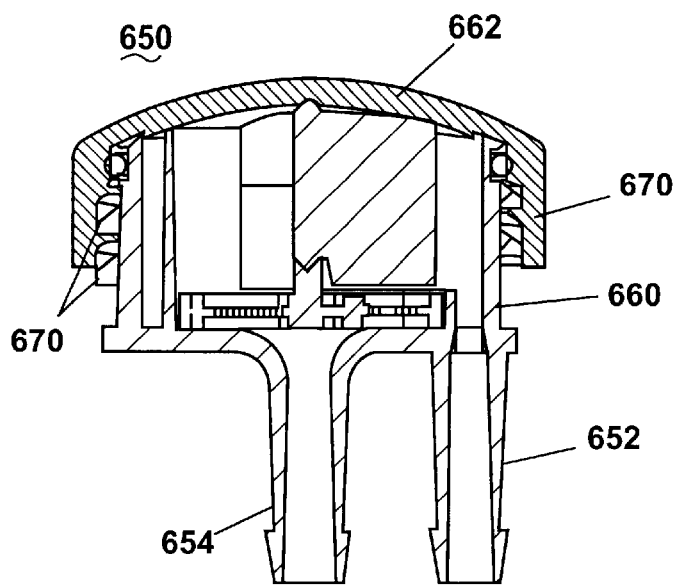
FIG. 20 is a side sectional view of the fluid flow indicator of FIG. 19.
Figure 19:
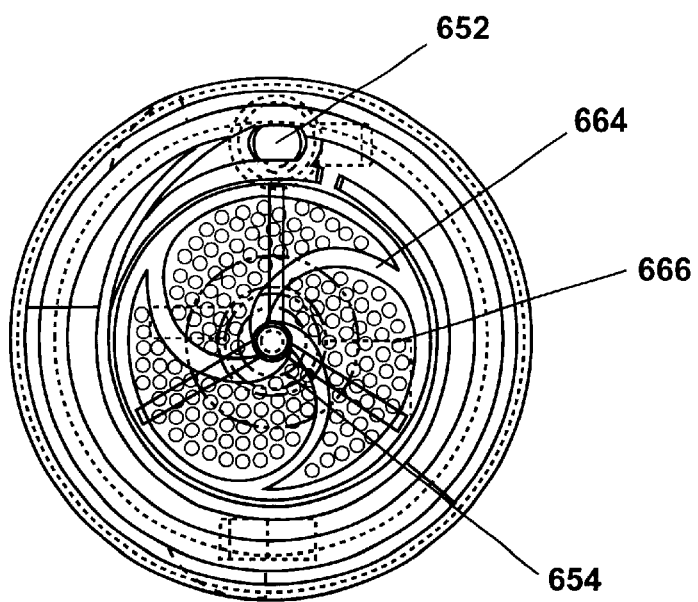
FIG. 19 is a top view of the fluid flow indicator of the extraction cleaning machine of FIG. 1.

The flow indicator 650 is placed in the fluid flow path to provide a visible indication of fluid flow to the fluid dispensing nozzles 100. As shown in FIGS. 19 and 20, the flow indicator 650 is mounted to an upper end of the arm 651, which extends upwardly from the motor housing 500 in the base module 14. An opening 653 in the upper housing portion 17 receives the flow indicator 650 when that portion is mounted to the lower housing portion 15. Alternatively, the flow indicator 650 can be mounted to the handle assembly 16 in a position to be easily viewed by the operator. The flow indicator 650 comprises a circular body 660 having an inlet 652, outlet 654, and a clear lid 662 having a threaded lip 670. As seen in FIG. 20, the indicator body 660 preferably houses an impeller 664 superjacent a screen filter 666, both of which are superjacent the fluid inlet 652 and the fluid outlet 654. The fluid inlet 652 is near the periphery of the body 660 and the outlet 654 is disposed centrally. The lid 662 has threads 670 on the outside of the body 660.

The lid 662 is clear, preferably made from the transparent plastic, so that the user can see the fluid flowing into the indicator 650 and rotating the impeller 664. Alternatively, one or more articles, such as a ball or disk can be mounted within the indicator body 660 and subjacent the lid 662, whereby the operator can determine if there is fluid flow by movement of the article. Further, while a body 660 mounting an impeller 664 is the preferred flow indicator, other suitable indicators include a float ball, spring plunger, or gravity plunger.

A float ball-type flow indicator can include a flow conduit having a T-shaped portion having a transversely oriented tube extending from a cylindrical body defining the fluid flow path. A ball or other article can be mounted at the junction of the transverse tube and cylindrical body for reciprocation within the transverse tube. When fluid is flowing through the cylindrical body, the ball or article moves into the transversely oriented tube, whereupon it is visible to the operator and indicates proper fluid flow.

A spring plunger-type flow indicator can include a light spring to bias a ball, plunger, or other article in a housing having a window visible to the operator. With fluid flowing through the housing, the ball, plunger, or other article moves against the bias of the spring to become visible in the window, thereby indicating to the operator that fluid is flowing properly. Alternatively, the ball, plunger, or other article can always be partially visible, and include portions corresponding to proper fluid flow, such as green for proper fluid flow and red for no fluid flow, whereby fluid flow causing movement of the ball, plunger, or other article against the spring bias would change the portion of the ball, plunger, or other article visible to the operator through the window, thereby indicating proper fluid flow.

A gravity plunger-type flow indicator can include a housing having a ball or other article mounted on a ramp adjacent a window. As fluid flows through the housing, the ball or other article is forced up the ramp, whereby it is visible to the operator to indicate proper fluid flow. Alternatively, like that for the spring plunger, a portion of the ball or other article previously not visible through the window can be visible when fluid flows through the housing to indicate to the operator that fluid flow is proper.

After pressurized fluid leaves the in-line heater 54, it enters the inlet 652 of the flow indicator 650 under pressure, such that it causes the impeller 664 to rotate in a clockwise direction as pictured in FIG. 20. The fluid rotates the impeller 664 until it reaches the center of the body 660, where it is forced through the screen filter 666 and outlet 654 by the continuous flow of pressurized fluid into the flow indicator body 660.

The screen filter 666 prevents any debris from exiting the flow indicator 650. Any debris trapped by the screen filter 666 remains visible to the operator through the lid 662. The operator can simply clean the flow indicator 650 by removing the threaded lid 662 and lifting the screen filter 666 from within the body 660 for cleaning. The screen filter 666 preferably includes apertures defined by the screen of a diameter smaller than the diameter a passageway through the spray nozzle 64. This is of particular importance if the spray nozzle is not easily serviceable by the operator or a service provider. Further, when using an in-line heater 54, a screen filter 666 is a precaution against plugging the passageway through the spray nozzle 64 from scales forming in the heater 54.

Figure 12:
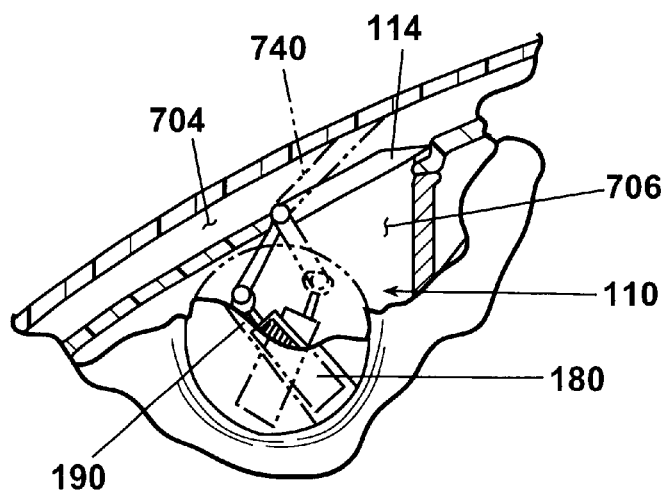
FIG. 12 is a partial side sectional view of a diverter valve with the valve plate shown in a first position and in phantom for a second position for the extraction cleaning machine of FIG. 1.
Figure 13:
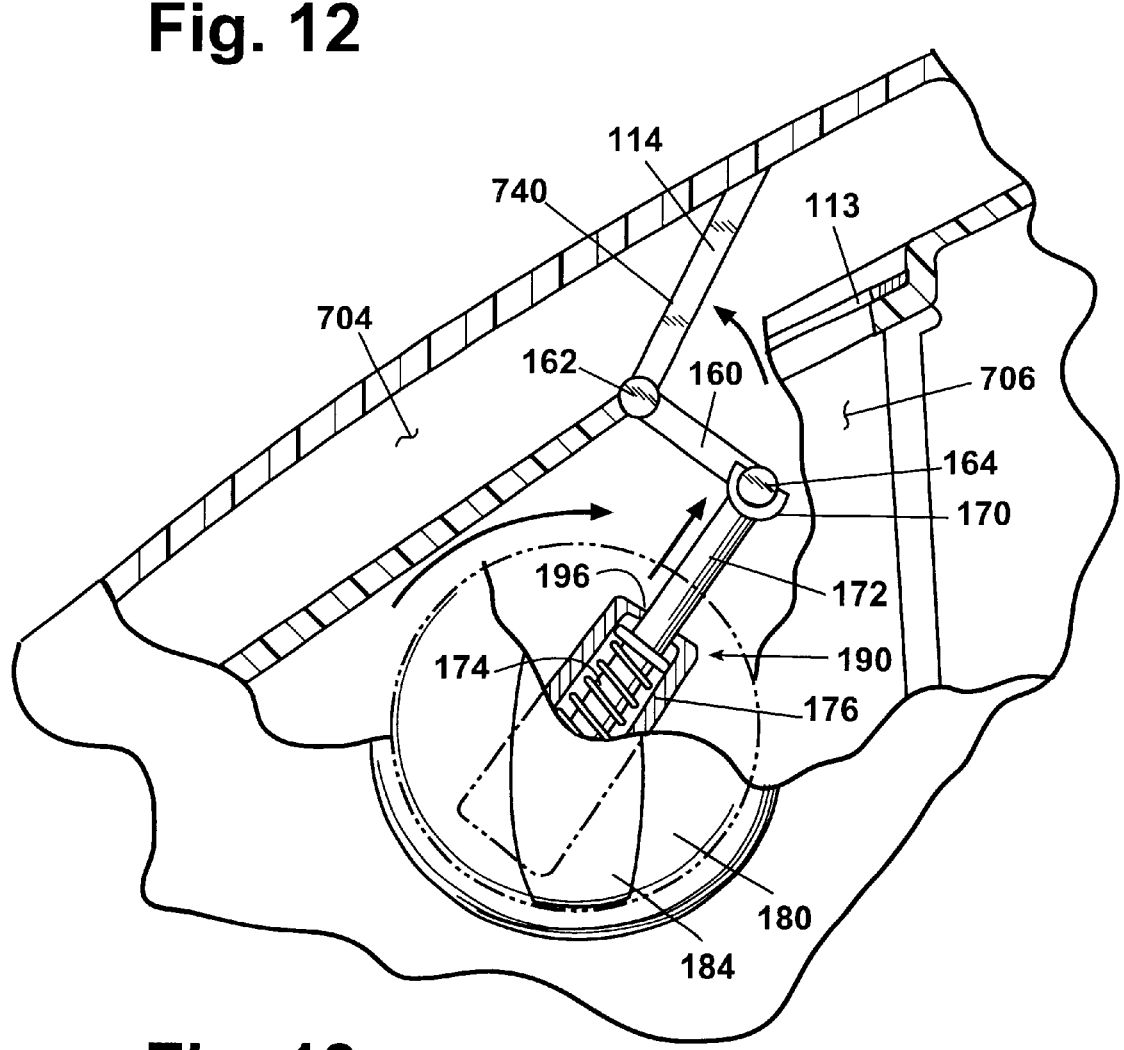
FIG. 13 is a partial side view of the valve assembly of FIG. 12 with the valve plate in the second position.

After the cleaning solution has been applied to the surface to be cleaned via the spray nozzle 64, or multiple spray nozzles 64, the used cleaning solution and entrapped dirt are removed from the surface being cleaned through the suction nozzle 34, which opens into the first working air conduit 704 extending along the top of the base module 14 between the upper housing portion 17 and the transparent facing 19, as best shown in FIGS. 2, 12 and 13. The first working air conduit 704 terminates at a junction 740 with the second working air conduit 706, which is defined by passageway communicating the vacuum source 40 with the suction nozzle (not shown) on the distal end of the accessory hose 22. With this configuration, the drive motor 196 creates the vacuum source 40 that is applied to the surface being cleaned through either working air conduit 704, 706.

The terminal end of the accessory hose 22 is secured to a hose mounting 702 at a distal end of the accessory hose intake duct 540 partially defining the second working air conduit 706, which extends, in a U-shape, to the junction 740 with the working air conduit 704, as best seen in FIGS. 1 and 12. A flapper valve 114 pivots at the junction 740, disposed in the base module 14, to alternatively close the first working air conduit 704, between the suction nozzle 34 and the air/water separator lid 700, and the second working air conduit 706 between the hose mounting 702 and the air/water separator lid 700, as best shown in FIGS. 12 and 14. The valve 114 seats on a gasket 113 about the junction 740. When the user is cleaning floors, the flapper valve 114 is in position to direct all of the working air generated by the vacuum source 40 to the suction nozzle 34. However, when the user desires to use the accessory hose 22, the flapper valve 114 is pivoted to an accessory hose position, as shown in phantom lines in FIG. 12. In this position, the flapper valve 114 seals the working air conduit 704 and connects the accessory hose 22 to the vacuum source 40. Regardless of whether the machine is operating for on-the-floor cleaning or accessory hose cleaning, all of the dirt and water recovered are directed into the recovery chamber 48.

An over-center diverter valve assembly 110 including a movable flapper valve 114 in the junction 740 between working air conduits 704, 706, and actuable by an actuator knob 180, on the extraction cleaner housing controls the diversion between the conduits 704, 706. More specifically, the actuator knob 180 to flapper valve 114 linkage assembly, as shown best in FIGS. 12 and 13, includes an arm 160 attached at an upper end to the flapper valve 114, which includes a transversely extending support axle 162, and at a lower end to a cup-shaped bearing 170 on the end of a piston 172. The support axle 162 is mounted for rotation in the junction 740 between the working air conduits 704, 706, whereupon the valve can pivot between two extreme positions, as shown in FIG. 12. At a lower end, the arm 160 ends in a transversely extending leg 164, which moves relative the center of the actuator knob 180 depending on the position of the actuator knob 180 when turned by the user.

The actuator knob 180 includes a handle 184, and a piston assembly 190 on a back face. The piston assembly 190 includes piston housing 176, piston 172, and a compression spring 174. The piston 172 slides coaxially in the housing 176, and is biased upwardly by the spring 174 mounted therein. Specifically, the spring 174 biases the piston 172 out of an opening 196 in a top portion of a tubular piston housing 176.

When the actuator knob 180 is turned by the user, the lower leg 164 moves closer or farther from the knob rotation axis, thereby increasing or decreasing the distance between the lower leg 164 and the axis. As this distance increases, the spring-biased piston 172 forces the lower leg 164 upwardly. The arcuate path of the lower leg 164 as it travels over the center of the knob axis rotation imparts rotation to the flapper valve 114 about the fixed support axle 162. The rotation is in response to the changed distance of the mounting of the piston assembly 190 from the actuator knob 180 rotation center. As it moves away from the center, the piston 172 expands at an angle relative to the support axle 162. The lower leg 164 of the L-shaped arm 160 must rotate in the cup-shaped bearing 170 at the end of the piston 172 because the axle 162 is fixed. Thus, the flapper valve 114 rotates in response to the angle of the joint between the expanded piston 172 and the lower leg 164 (not shown). Tabs formed on the back face of the knob 180 limit the rotation of the knob so as to effectively define two positions correlating to the open conduit 704/closed conduit 706 position and the open conduit 706/closed conduit 704 positions.

The diverter valve assembly 110 described above permits the upright extraction cleaner fluid dispensing mechanism to be used as a pre-spray applicator. That is, by diverting the suction to the accessory hose 22, and applying solution through the fluid dispensing nozzles 100 adjacent the agitation brush 206, the upright extraction cleaner 12 can be used to dispense fluid and agitate the carpet without having the applied solution immediately extracted from the carpet through the suction nozzle 34 adjacent the agitation brush 206 and fluid dispensing nozzles 100. Thus, the fluid application system 950 remains operable regardless of the position of the flapper valve 114.

As best seen in FIGS. 12–14, 14A and 14B, the working air conduit 704 terminates at the junction 740 with the working air conduit 706. The junction 740 connects the selected conduit 704, 706 to a U-shaped inlet 780 to the air/water separator lid 700, which is secured to the tank assembly 50 by the rotatable handle 790. Thus, from the U-shaped inlet 780 to the air inlet 764, the air path entering the lid 700, as shown in FIG. 14, is substantially horizontal.

From the tank air inlet 764, the air/water/debris mixture is conducted into a center portion of a tank lid separation chamber 750, where the cross sectional area is greater than the flow conduits 704, 706, junction 740, and inlets 780, 764 to slow down the velocity of the air stream for gravity separation of the air from the liquid, dirt and debris. Because the lid 700 is formed of a transparent plastic material, the user can easily observe the dirt and water passing up through the intermediate flow conduit and the fluid level inside the tank assembly 50.

The substantially rectangular chamber 750 is defined by a transparent lower portion 752 substantially surrounded on all sides by a transparent side wall integral with the underside of the air/water separation lid 700. The chamber 750 is further defined upwardly by a transparent face 756 of the lid 700. The air inlet opening 764 is disposed adjacent an air outlet opening 776. The underside of the face 756 further includes a circular downwardly extending shroud 770 adapted to surround in part the open flexible bladder filling spout 124, which is retained by the baffle plate 800 and positioned adjacent the separation chamber 750.

The working air flow enters the hollow interior of the separation chamber 750 via the air and water inlet 764 and passes horizontally beneath the transparent face 756 to a rear wall defining a first diverter baffle 755 at which it is redirected 180° forwardly through an opening 751 to a rectangular, extended outlet passage 757 formed in a lower, intermediately disposed portion of the bottom wall 752 at which it is again redirected 180° by a second diverter baffle 759 defined by a front wall disposed forward, transverse, and beneath the opening 751. The air flow then exits the separation chamber 750 through an inlet outlet 760, whose position is dictated by tank geometry, as the preferred position is a "dead spot" in tank air flow to maximize air/water separation. From here, the water is directed into the interior of the tank between the 750 and the baffle 800, and away from the separation chamber 750 to the air exit 762. It is significant that all air/water separation occurs above the baffle plate 800, thus minimizing interference with the recovered water (i.e., no foaming) in the area disposed below the baffle plate 800. This characteristic is necessitated by the inclusion of a flexible bladder disposed in the tank recovery chamber.

In summary, air and water enters the inlet 764, from where it is channeled to the air/water separation chamber 750 in which it strikes the first diverter baffle 755, is redirected approximately 180° and through the opening 751 to the outlet passage 757, where it is again redirected approximately 180° by second diverter baffle 759, and then passes into the interior of the recovery chamber 48. The multiple changes in direction as well as the expansion in volume in the separation chamber 750 facilitate the separation of water and debris from the air. As best seen in FIG. 14, the air, free of water and debris, exits the tank via rectangular outlet 762, and traverses a horizontal conduit 774 to a vertical exit conduit 776, which is disposed adjacent the horizontal inlet 780 leading air into the separation lid 700 via air inlet opening 764. Thus, the air inlet 780 and air exit conduit 776 are vertically adjacent. The air exit conduit 776 feeds the vacuum intake duct 530, which is connected to the vacuum source 40, as best seen in FIGS. 2 and 15.

As best shown in FIGS. 3, a fluid containment baffle 800 is mounted inside the hollow interior of the tank assembly 50 immediately below the separation lid 700, and is intended to prevent the excessive sloshing of the recovered dirt and liquid and also contain any foam generated inside the tank assembly 50. The planar baffle 800 comprises a flat body 810 mated to snap fit within the tank housing 46. Further, apertures 820 are formed through the plate 800 for receiving the recovered fluid into the recovery chamber 48 of the tank assembly 50. A circular aperture 826 retains the bladder filling spout 124 in position by preventing it from floating upwardly in the tank and further locking the bladder in place while giving it mechanical support.

The baffle plate 800 is snapped into place by retainers 830 that are received on tabs 836 formed on the interior of tank housing 46 to secure the baffle plate 800 in the tank assembly 50. The apertures are centrally mounted in the baffle plate 800 to prevent air movement, while facilitating fluid and debris deposits, into a lower portion of tank assembly 50 so that the recovered fluid remains undisturbed. Further, the baffle plate 800 is closed at the edges to prevent sloshing of the recovered fluid into an upper portion of the tank assembly 50 during movement of the cleaning machine 12.

Figure 14A:
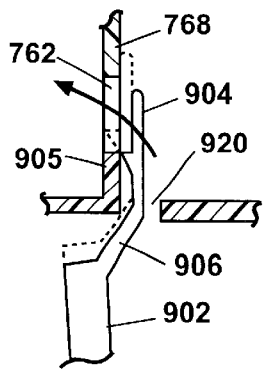
FIG. 14A is a partial side view of a closure plate in three positions relative an air exit from the air/water separator lid of FIGS. 13 and 14.
Figure 14B:
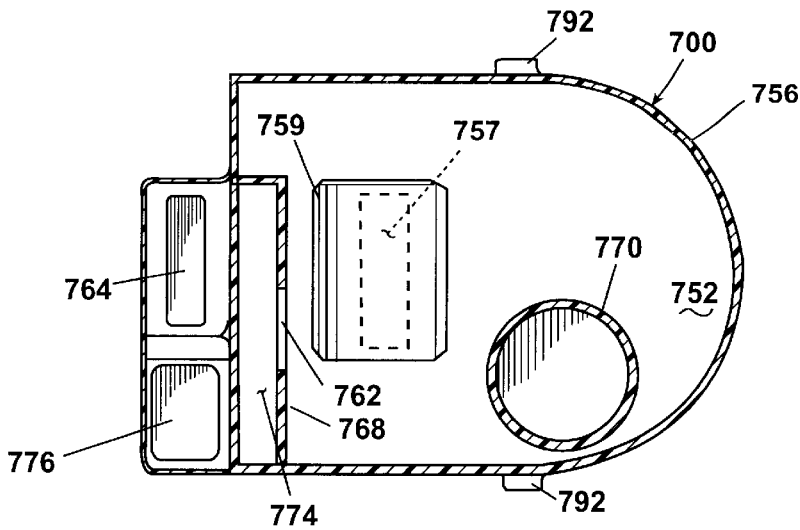
FIG. 14B is a partial sectional view taken along lines 14B—14B of FIG. 14.

As shown best in FIGS. 14 and 14A, a float assembly 900 extends through the baffle plate 800 for moving an integral door across the exit port of the tank to prevent recovered solution from entering the tank exhaust in an overfill condition. As best shown in FIG. 3, the flag-shaped float assembly 900 comprises a buoyant base 902 and a closure plate 904 interconnected to one another by a support plate 906. The closure plate 904 is dimensioned to fully seal the air exit 762 to the tank to prevent recovered solution from entering the tank exhaust in an overfill condition, as illustrated in phantom lines in FIG. 14A. The closure plate 904 further includes a pair of triangular projections 905 extending transversely from a substantially vertical front face. The front face engages the wall 768 defining the air exit 762 from the tank, and the projections 905 cam along that wall 768 to prevent premature and partial closing of the exit 762 as the plate 904 is drawn against the exit by the suction therethrough.

The float assembly 900 is limited primarily to vertical movement with respect to the tank assembly 50, with the closure plate 904 positioned above the fluid containment baffle 800 and the buoyant base 902 positioned below the baffle 800. A narrow slot 920 is provided in a front portion of the baffle 800 through which the support plate 906 of the float extends. Further, a housing 910 secured to the interior of the tank housing 46 guides the buoyant base, and thus the float assembly 900, in a vertical direction. In the assembled position, the closure plate 904 is positioned above the baffle 800 and the buoyant base 902 is positioned below the baffle 800.

As the recovered fluid within the tank assembly 50 rises, the float assembly 900 will also rise until, eventually, the closure plate 904 nears the tank exhaust exit opening, at which point the closure plate 904 is sufficiently drawn against the exit 762 opening by the suction from the vacuum motor to close the airflow therethrough. As discussed above and illustrated in FIG. 14A, the triangular projection 905 extending from the front face 907 ensure the closure plate is not drawn against the exit 762 prematurely, which would result in a partial closure of the opening. Rather, the projections 905 ride the housing defining the opening until drawn into total closure of the exit 762. Once this happens, the pitch of the operating vacuum changes sufficiently to warn the user that the fluid recovery chamber 48 is full and must be emptied.

As best shown in FIG. 3, a drain plug 850 seals an aperture through a wall in a lower portion of the rigid housing 46 of the tank assembly 50 through which recovered fluid can be removed without tipping the tank assembly 50, and also through which the tank assembly 50 can be cleaned by flow-through rinsing. More specifically, a rounded wall of the rigid tank housing 46 includes the drain plug 850 mounted in an aperture 854. A bottom portion of the aperture 854 is substantially planar with a bottom wall 860 of the tank housing 46. Thus, any recovered fluid will flow through the aperture 854 when the drain plug 850 is removed therefrom. Further, the tank assembly 50 can be cleaned without having to tip the tank assembly 50 since the drain plug 850 can be removed for flow-through rinsing. This feature is particularly important because the flexible bladder 120 defining the fluid supply chamber 49 remains in place while the recovered fluid is drained from the recovery chamber 48. The drain plug 850 eases cleaning of both the interior of the rigid housing 46 and the exterior of the flexible bladder 120.

Figure 21:
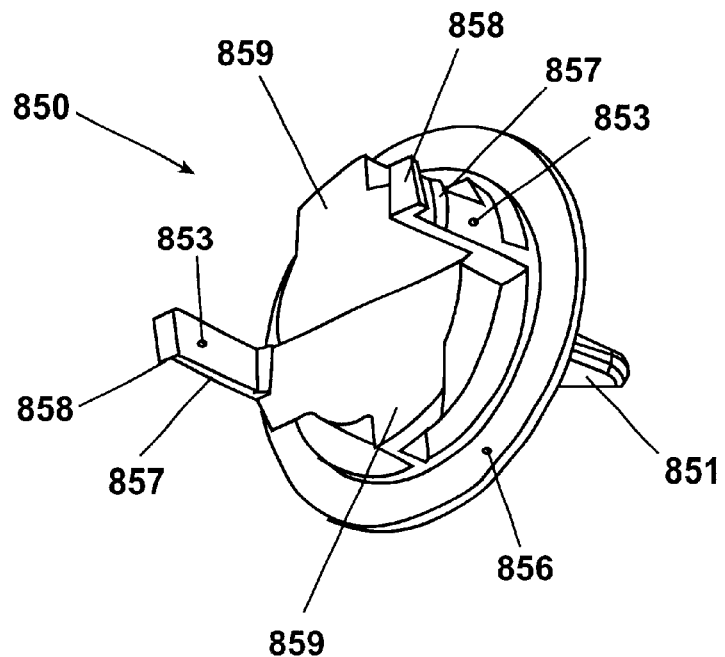
FIG. 21 is a bottom perspective view of a drain plug of the base module and tank assembly of FIG. 3.
Figure 22:
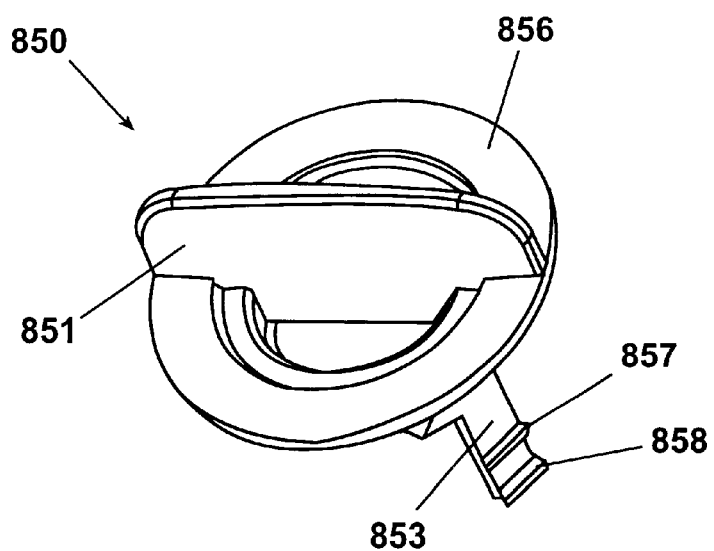
FIG. 22 is a top perspective view of the drain plug of the base module and tank assembly of FIG. 3 and illustrated in FIG. 22.

As best shown in FIGS. 21 and 22, the drain plug 850 comprises a knob 851 extending through a circular washer 856 which mounts two resilient legs 853. The resilient legs 853 are located diametrically on a lower face of the washer 856 and comprise, on an outer face of each leg 853, an upper ridged protrusion 857 and a lower ridged protrusion 858. The lower ridged protrusion 857 is rounded so that it forms a detent mechanism with the opening in the tank wall. The upper ridged protrusion 857 has a slanted outer surface so that the legs are resiliently deflected as the drain plug is installed into the aperture 854, and has a sharp return inner surface so that the return inner surface will bear against the inner surface of the wall of the tank housing as the drain plug 850 is pulled outwardly of the tank. Thus, the drain plug is easily installed into the aperture 854, but is retained therein by the inner surface when the plug is removed from the aperture 854 for draining the tank. In the normal, closed position of the drain plug 850, the lower face of the washer 856 abuts the rear wall of the tank housing 46. The drain plug further has a pair of retaining flanges 859 which fit behind the wall of the tank adjacent the aperture 854. To this end the aperture has indented slots to receive the flanges 859. The To drain fluid through the aperture 854, the drain plug 850 is rotated a quarter turn counterclockwise and pulled toward the rear of the upright extraction cleaning machine 12 a suitable distance such that the upper ridged protrusion 857 of the resilient legs 853 moves past the rear wall of the tank housing 46 and the lower ridged protrusion 858 of the resilient legs 853 abuts the inner wall of the tank housing 46. The diameter of the aperture 854 is less than the normal distance between the resilient legs 853 so that the legs 853 are pressed inwardly and thereby prevent the drain plug 850 from separating from the tank housing 46. The drain plug 850 is restored to its normal, closed position by pressing the drain plug 850 toward the front of the upright extraction cleaning machine 12 to cause the washer 856 to abut the rear of the tank housing 46 and turning the drain plug 850 one-quarter turn clockwise.

In use, the operator removes the tank assembly 50 from the well 36 in the base module 14, and further removes the lid 750 from the tank housing 46 to expose the open filling spout 124 of the flexible bladder 120, whereupon the bladder 120 can be filled with water from a source such as a household tap. Next, the user replaces the lid 750 and swings the handle 790 upwardly to seal the lid 750 to the tank housing 46, whereupon the tank assembly 50 can be carried to the well 36 of the base module 14 and replaced therein for use. Upon replacement, the valve member 82 in the valve mechanism 80 mounted in the bottom surface 862 of the tank housing 46 is displaced by the projection 94 in the valve seat 88, whereupon the clean water in the fluid supply chamber 49 is in fluid communication with the fluid application system 950. The detergent supply tank 870 is removed from its well 884, and then its cap 880 is removed so that the tank 870 can be filled with concentrated detergent. Once the supply tank 870 is filled and the cap 880 is replaced thereon, the supply tank 870 is replaced in its well 884, whereupon its valve mechanism 882 permits the flow of concentrated detergent through the conduit 318 to the mixing valve assembly 310.

The extraction cleaning machine 12 can then be powered by activating an main power switch 534 disposed on the handle assembly 16, whereby the motor 196 is activated, and the vacuum source 40 for the working air flow conduits 704, 708 are operable. Further, the heater 54 is separately operable by a heater power switch 536 when the main power switch 534 is in the "on" position. The user then supplies pressurized cleaning solution to the agitation brush 206 by depressing the switch 432 in the closed loop grip 18, whereupon solution flows to and through the fluid dispensing nozzles 100. As the user applies cleaning fluid and agitates the surface being cleaned with the brush 206, the user pushes the cleaning machine 12 forward and rearward, with the forward strokes being defined as wet cycles and the rearward strokes being defined as dry cycles. During the wet cycles, the cleaning solution is applied to the surface via the fluid dispensing nozzles 100 and the agitation brush 206 scrubs the subjacent surface. During the dry cycles, the suction nozzle 34 removes applied solution, as well as dirt and debris, from the surface being cleaned and carries it to the recovery chamber 49 via the working air conduit 704.

The cleaning machine 12 can also be used as a pre-spray applicator and agitator by simply diverting the air from working air conduit 704 to the working air conduit 708, which connects the vacuum source 40 to the accessory hose 22. In this use, the accessory hose 22 functions solely as a bypass aperture for the working air supplied by the vacuum source 40. Thus, fluid is applied via the fluid dispensing nozzles 100 and agitated into the surface being cleaned by the brush 206, but there is no suction at the suction nozzle 34, and thus no dry cycle. When the solution has been adequately applied and the surface adequately agitated, the user can divert suction back to the working air conduit 704, whereupon the applied solution and other debris can be removed from the surface without application of solution, which is controlled by the user through trigger 432.

To use the accessory cleaning tool (not shown), the user diverts working air flow from the conduit 704 to the conduit 708, whereupon the accessory hose 22 is fluidly connected to the vacuum source 40. Furthermore, the user can apply pressurized cleaning fluid to the surface to be cleaned by pressing the grip valve 132 on the accessory cleaning tool. In sum, cleaning solution can be applied by actuating the grip valve 132 and removed via the suction nozzle (not shown) in communication with the vacuum source 40 via the working conduit 708. Also, the accessory tool may further include an agitation brush driven by an impeller that is driven by ambient air drawn through an aperture distinct from the suction nozzle in the accessory tool, but towards the same vacuum source 40.

Once the surfaces have been cleaned, or the recovery chamber 48 has become filled and the float assembly 900 has blocked the air exit 762 from the air/water separator lid 750, power to the cleaning machine 12 is turned off and the tank assembly 50 is removed from the well in the base module 14 and carried by its handle 790, which seals the lid 750 to the tank housing 46, and carried to a point of disposal, such as a sink drain, whereupon the contents of the recovery chamber 48 can be emptied by removing the drain plug 850 from the aperture 854 through wall 852. Once removed, the contents of the recovery chamber 48 flow through the aperture 854. Furthermore, the tank assembly 50 can be rinsed with clean water, which also flows through the aperture 854 in the wall 852 of the tank housing 46.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the invention.

What is claimed is:

1. A portable surface cleaning apparatus, comprising:
   a base module for movement along a surface and comprising a base housing having a rear portion;
   the base housing including an upper housing portion and a lower housing portion which have arcuate surfaces that between them define sockets;
   an upright handle having depending arms spanning the base housing, the arms having inner and outer sides, with the inner sides being adjacent the base housing, the inner sides of the arms having bearings which are rotatably received in the sockets defined by the arcuate surfaces of the upper and lower housing portions, for pivotally mounting the handle to the base housing;
   a fluid recovery system comprising:
      a tank having a fluid recovery chamber for holding recovered fluid;
      a suction nozzle;
      a working air conduit extending between the recovery chamber and the suction nozzle;
      a vacuum source in fluid communication with the recovery chamber for generating a flow of working air from the nozzle through the working air conduit and through the recovery chamber to thereby draw dirty liquid from the surface to be cleaned through the nozzle and working air conduit and into the recovery chamber; and
   a liquid dispensing system comprising:
      a liquid dispensing nozzle associated with the base module for applying liquid to a surface to be cleaned;
      a fluid supply chamber for holding a predetermined amount of cleaning fluid; and
      a fluid supply conduit fluidly connected to the fluid supply chamber and to the dispensing nozzle for supplying liquid to the dispensing nozzle.

2. A portable surface cleaning apparatus according to claim 1 wherein the bearings are formed integrally with the arms.

3. A portable surface cleaning apparatus according to claim 2 wherein the arcuate surfaces are formed by sidewalls of the upper and lower housing portions.

4. A portable surface cleaning apparatus according to claim 2 and further comprising:
   each bearing having an axis about which the handle pivots with respect to the base housing;
   an axle mounted to each of the bearings and coaxial with respect to the axis of the bearings; and
   a wheel rotatably mounted to each of the axles.

5. A portable surface cleaning apparatus according to claim 4 wherein the bearings have a large diameter relative to the axles.

6. A portable surface cleaning apparatus according to claim 1 wherein the arcuate surfaces are formed by sidewalls of the upper and lower housing portions.

7. A portable surface cleaning apparatus according to claim 1 wherein each bearing has a circumferential slot in which the arcuate surfaces are received.

8. A portable surface cleaning apparatus, comprising:
   a base module for movement along a surface and comprising a housing having a rear portion;
   the housing including an upper housing portion and a lower housing portion;
   an upright handle pivotally attached to the rear portion of the base module and including a lower portion having a bearing for rotatable reception in the housing;
   a fluid recovery system comprising:
      a tank on the base module having a fluid recovery chamber for holding recovered fluid;
      a suction nozzle;
      a working air conduit extending between the recovery chamber and the suction nozzle;
      a vacuum source in fluid communication with the recovery chamber for generating a flow of working air from the nozzle through the working air conduit and through the recovery chamber to thereby draw dirty liquid from the surface to be cleaned through the nozzle and working air conduit, and into the recovery chamber;
   a liquid dispensing system comprising:
      a liquid dispensing nozzle associated with the base module for applying liquid to a surface to be cleaned;
      a fluid supply chamber for holding a predetermined amount of cleaning fluid;
      a fluid supply conduit fluidly connected to the fluid supply chamber and to the dispensing nozzle for supplying liquid to the dispensing nozzle;
   the improvement comprising a socket formed between the upper and lower housing portions for rotatably receiving the bearing.

9. A portable surface cleaning apparatus according to claim 8 wherein the bearing is formed integrally with the lower portion of the upright handle.

10. A portable surface cleaning apparatus according to claim 9 wherein the socket is formed by arcuate surfaces in sidewalls of the upper and lower housing portions.

11. A portable surface cleaning apparatus according to claim 8 wherein the socket is formed by arcuate surfaces in sidewalls of the upper and lower housing portions.

12. A portable surface cleaning apparatus according to claim 11 wherein the bearing has a circumferential slot in which the arcuate surfaces are received.

13. A portable surface cleaning apparatus according to claim 12 wherein wheels are mounted to the base module housing rear portion through axles and the bearing has a diameter substantially larger than the diameter of the axles.

14. A portable surface cleaning apparatus according to claim 8 wherein the suction nozzle is mounted on the base module.

15. A portable surface cleaning apparatus according to claim 1 wherein the suction nozzle is mounted on the base module.

* * * * *